(12) United States Patent
Nakayama et al.

(10) Patent No.: US 8,477,274 B2
(45) Date of Patent: Jul. 2, 2013

(54) LIQUID CRYSTAL DISPLAY DEVICE

(75) Inventors: Hajime Nakayama, Minami-ashigara (JP); Nobutaka Fukagawa, Minami-ashigara (JP); Hirofumi Toyama, Minami-ashigara (JP); Yujiro Yanai, Minami-ashigara (JP); Yoshiaki Hisakado, Minami-ashigara (JP)

(73) Assignee: FUJIFILM Corporation, Minato-Ku, Tokyo (JP)

( * ) Notice: Subject to any disclaimer, the term of this patent is extended or adjusted under 35 U.S.C. 154(b) by 1155 days.

(21) Appl. No.: 12/237,843

(22) Filed: Sep. 25, 2008

(65) Prior Publication Data

US 2009/0086131 A1    Apr. 2, 2009

(30) Foreign Application Priority Data

Sep. 28, 2007  (JP) ................. 2007-254600
Jun. 9, 2008   (JP) ................. 2008-150532

(51) Int. Cl.
    *G02F 1/1335*    (2006.01)
(52) U.S. Cl.
    USPC .............. 349/118; 349/96; 349/119
(58) Field of Classification Search
    USPC ............................. 349/117–119, 96
    See application file for complete search history.

(56) References Cited

U.S. PATENT DOCUMENTS

| | | | |
|---|---|---|---|
| 7,981,488 B2 | 7/2011 | Fukagawa et al. | |
| 2007/0040962 A1* | 2/2007 | Ohgaru et al. | 349/96 |
| 2007/0046864 A1* | 3/2007 | Maruyama et al. | 349/96 |
| 2007/0190268 A1* | 8/2007 | Nakayama et al. | 428/1.3 |
| 2008/0192192 A1* | 8/2008 | Toyama et al. | 349/117 |
| 2009/0153782 A1 | 6/2009 | Fukagawa et al. | |
| 2010/0062361 A1 | 3/2010 | Iwase | |

FOREIGN PATENT DOCUMENTS

| | | |
|---|---|---|
| EP | 0 911 656 A2 | 4/1999 |
| JP | 3330574 B2 | 9/2002 |
| JP | 2004-004550 A | 1/2004 |
| JP | 2005-134863 A | 5/2005 |
| JP | 2006-257380 A | 9/2006 |
| JP | 2007-017958 A | 1/2007 |

OTHER PUBLICATIONS

Fuji Photo Film Co. Ltd., Method for Producting Cellulose Ester Film, Cellulose Ester Film, Polarizing Plate, and Liquid Crystal Display Device, Machine Translation of JP 2006-257380 A, pp. 1-85.*

Japanese Office Action issued on Sep. 25, 2012 in corresponding Japanese Patent Application No. 2008-238874, with partial translation.

* cited by examiner

*Primary Examiner* — Edward Glick
*Assistant Examiner* — Dennis Y Kim
(74) *Attorney, Agent, or Firm* — Buchanan Ingersoll & Rooney PC

(57) ABSTRACT

Disclosed is a liquid-crystal display device comprising a liquid-crystal cell comprising a liquid-crystal layer that aligns vertically to the substrate thereof in a black state, two polarizing elements that are disposed to sandwich the liquid-crystal cell therebetween in a manner that their absorption axes are perpendicular to each other, and retardation films having equivalent optical anisotropy that are disposed between each of the two polarizing elements and the liquid-crystal cell, wherein the retardation films comprise a cellulose acylate and a liquid-crystal compound, and satisfy 30 nm$\leq$Re(550)$\leq$80 nm, 70 nm$\leq$Rth(550)$\leq$140 nm, Re(450)/Re(550)<1 and Re(650)/Re(550)>1.

8 Claims, 2 Drawing Sheets

LIQUID CRYSTAL DISPLAY DEVICE

CROSS-REFERENCE TO RELATED APPLICATIONS

This application claims benefit of priority under 35 U.S.C. 119 to Japanese Patent Application Nos. 2007-254600 filed on Sep. 28, 2007 and 2008-150532 filed on Jun. 9, 2008; and the entire contents of the application are incorporated herein by reference.

BACKGROUND OF THE INVENTION

1. Field of the Invention

The present invention relates to a liquid-crystal display device comprising polarizing plates and retardation films, and in particular to a VA (vertically aligned)-mode liquid-crystal display device.

2. Related Art

It is known that a VA-mode liquid-crystal display device, comprising polarizers each disposed on and below a liquid-crystal cell with their absorption axes crossing vertically to each other, can achieve a wide viewing angle, or that is, can have improved display characteristics, by employing an optically biaxial retardation film disposed between each polarizer and the liquid-crystal cell (for example, Japanese Patent No. 3330574).

Heretofore, it is said that the retardation film to be used in the VA-mode liquid-crystal display device having the above-mentioned constitution must have retardation in plane (Re) of from 20 to 70 nm or so and retardation along thickness direction (Rth) of from 70 to 400 nm or so. Accordingly, it has been considered that, as the retardation film, a synthetic polymer film such as a polycarbonate film and a polysulfone film having a high retardation value (that is, having a large intrinsic birefringence) is advantageous.

On the other hand, a cellulose acylate film, especially a cellulose acetate film is characterized in that its intrinsic birefringence is small (that is, its retardation value is low), as compared with other polymer films. Accordingly, for use that requires optical isotropy, for example, for protective films for polarizer, cellulose acetate films are generally used.

EP-A 0911656A2 discloses a cellulose acetate film having a high retardation value and therefore applicable even to use that requires optical anisotropy, overturning a conventional general principle. In the document, an aromatic compound having at least two aromatic rings is added to a cellulose ester, thereby providing a cellulose ester film having a high retardation value. In general, it is known that cellulose triacetate is a hardly-stretchable polymer material and its birefringence is difficult to increase; however, by adding an additive thereto and stretching the film for alignment, the document has made it possible to increase the birefringence and to realize a high retardation value of the film. The film may serve also as a protective film for polarizer, and is therefore advantageous in that it may provide an expensive and thin-film liquid-crystal display device.

JPA No. 2005-134863 discloses an optical compensation sheet formed of a cellulose acylate film alone having Re of from 20 to 70 nm, Rth of from 70 to 400 nm and Re/Rth of from 0.2 to 0.4 and having a thickness of from 40 to 110 μm, to which is added a rod-shaped compound having at least two aromatic rings.

SUMMARY OF THE INVENTION

These days it is desired to improve the moving image display performance of liquid-crystal display deices, for which it is desired to thin the liquid-crystal cell in the devices. As a result of our investigations, the present inventors have known that, when a thinned VA-mode liquid-crystal cell is optically compensated by a conventional retardation film, then Re of the retardation film is not enough and the optical compensation is therefore insufficient.

Re and Rth of a retardation film are a product of the value of birefringence and the thickness thereof; and therefore, when the thickness of a retardation film is increased, then Re thereof may be increased. However, along with the requirement for reducing the thickness of a liquid-crystal cell, it is also desired to reduce the thickness of a retardation film; and therefore, it is necessary to attain a larger Re of a retardation film having a smaller thickness.

An object of the invention is to provide a liquid-crystal display device having the advantages in that it can be thinned, its viewing angle and contract are improved, its viewing angle-dependent color shift is reduced and its display performance is improved.

The means for achieving the above mentioned object are as follows.

[1] A liquid-crystal display device comprising:

a liquid-crystal cell comprising a liquid-crystal layer that aligns vertically to the substrate thereof in a black state, two polarizing elements that are disposed to sandwich the liquid-crystal cell therebetween in a manner that their absorption axes are perpendicular to each other, and retardation films having equivalent optical anisotropy that are disposed between each of the two polarizing elements and the liquid-crystal cell, wherein the retardation films comprise a cellulose acylate and a liquid-crystal compound, and satisfy following formulas (I) to (IV):

$$30 \leq Re(550) \leq 80 \qquad (I)$$

$$70 \leq Rth(550) \leq 140 \qquad (II)$$

$$Re(450)/Re(550) < 1 \qquad (III)$$

$$Re(650)/Re(550) > 1 \qquad (IV)$$

wherein $Re(\lambda)$ means retardation [nm] in plane of each of the films measured at a wavelength $\lambda$ [nm]; and $Rth(\lambda)$ means retardation [nm] along thickness direction of each of the films measured at a wavelength $\lambda$ [nm].

[2] The liquid-crystal display device as set forth in [1], wherein the retardation films satisfy following formulas (V) and (VI):

$$Rth(450)/Rth(550) < 1 \qquad (V)$$

$$Rth(650)/Rth(550) > 1. \qquad (VI)$$

[3] The liquid-crystal display device as set forth in [1] or [2], wherein the retardation films satisfy following formula (VII):

$$1.2 \leq Rth(550)/Re(550) \leq 2.6. \qquad (VII)$$

[4] The liquid-crystal display device as set forth in any one of [1] to [3], wherein the retardation films contain the liquid-crystal compound in an amount of from 0.1% by mass to 30% by mass, and the ratio of the liquid-crystal compound to the whole additive is from 5% by mass to 100% by mass.

[5] The liquid-crystal display device as set forth in any one of [1] to [4], wherein the liquid crystal compound is a compound represented by formula (A):

(A)

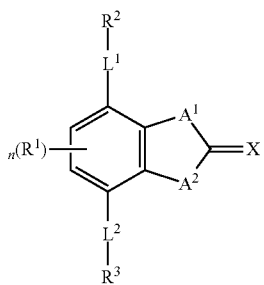

where $L^1$ and $L^2$ independently represent a single bond or a divalent linking group; $A^1$ and $A^2$ independently represent a group selected from the group consisting of —O—, —NR— where R represents a hydrogen atom or a substituent, —S— and —CO—; $R^1$, $R^2$ and $R^3$ independently represent a substituent; X represents a nonmetal atom selected from the groups 14-16 atoms, provided that X may bind with at least one hydrogen atom or substituent; and n is an integer from 0 to 2.

[6] The liquid-crystal display device as set forth in any one of [1] to [4], wherein the liquid crystal compound is a compound represented by formula (a):

$$Ar^1\text{-}L^{12}\text{-}X\text{-}L^{13}\text{-}Ar^2 \qquad (a)$$

where $Ar^1$ and $Ar^2$ each independently represent an aromatic group; $L^{12}$ and $L^{13}$ each independently represent a divalent linking group selected from the group consisting of —O—CO— and —CO—O—; and X represents 1,4-dicyclo hexylene, 1,4-dicyclo hexylene, vinylene or ethynylene.

[7] The liquid-crystal display device as set forth in any one of [1] to [6], wherein the retardation films further comprises a discotic compound having an absorption peak at a wavelength falling within the range from 250 nm to 380 nm.

[8] The liquid-crystal display device as set forth in any one of [1] to [7], wherein the retardation films have a thickness falling within the range from 30 to 100 μm.

[9] The liquid-crystal display device as set forth in any one of [1] to [8], wherein the liquid-crystal layer in the black state and the retardation films satisfy the following formula (VIII):

$$0.5 \leq (2 \times Rth(550))/\Delta n(550) \times d \leq 1.3 \qquad (VIII)$$

where Δn(550) means the intrinsic birefringence at 550 nm of the liquid crystal in the liquid-crystal layer; d means the thickness of the liquid-crystal layer; and Rth(550) means retardation along thickness direction of each of the retardation films at 550 nm.

Figure 1:
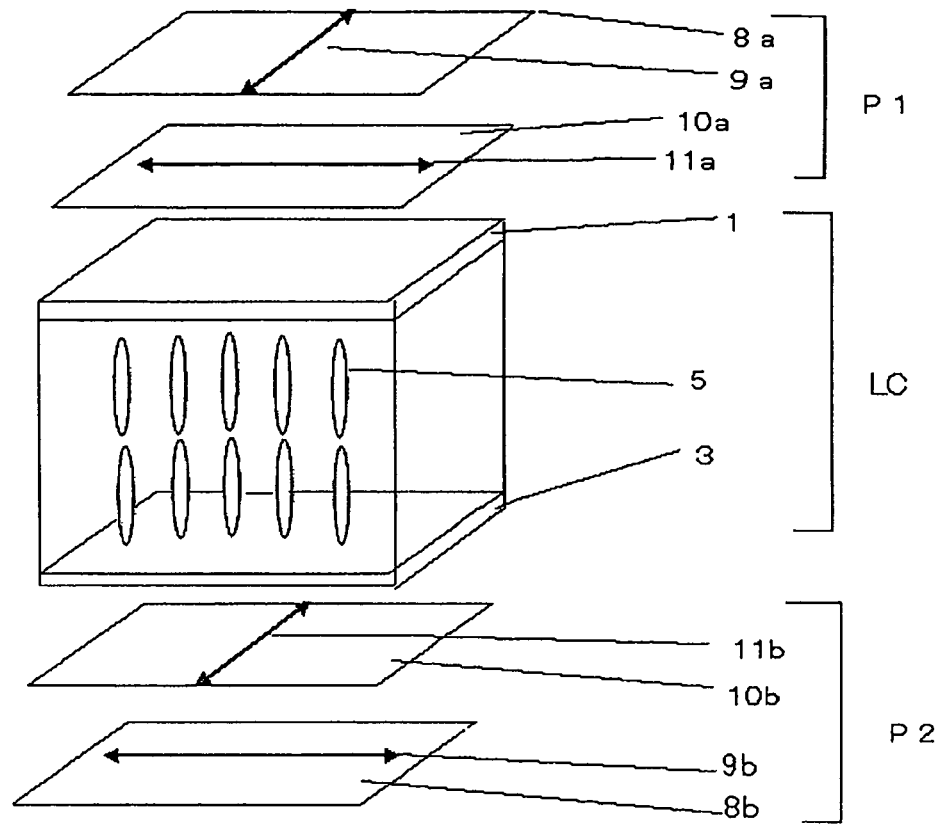
FIG. 1 is a simple outline view of one example of the liquid-crystal display device of the invention.

In the drawings, the reference numerals have the following meanings:
1 Upper substrate of liquid-crystal cell
3 Lower substrate of liquid-crystal cell
5 Liquid-crystal layer (liquid-crystal molecule)
8a, 8b Polarizing film
9a, 9b Absorption axis of polarizing film
10a, 10b Retardation film
P1, P2 Polarizing plate
LC Liquid-crystal cell

DETAILED DESCRIPTION OF THE INVENTION

The invention will be described in detail below. The expression "from a lower value to an upper value" referred herein means that the range intended by the expression includes both the lower value and the upper value.

In the description, Re(λ) and Rth(λ) each indicate a retardation in plane (unit:nm) and a retardation along thickness direction (unit:nm) at a wavelength λ. Re(λ) is measured by applying a light having a wavelength of λ nm in the normal line direction of a sample such as a film, using KOBRA-21ADH or WR (by Oji Scientific Instruments).

When the sample to be tested is represented by an uniaxial or biaxial refractive index ellipsoid, then its Rth(λ) is calculated according to the method mentioned below.

With the in-plane slow axis (determined by KOBRA 21ADH or WR) taken as the inclination axis (rotation axis) of the sample (in case where the sample has no slow axis, the rotation axis of the sample may be in any in-plane direction of the sample), Re(λ) of the sample is measured at 6 points in all thereof, up to +50° relative to the normal line direction of the sample at intervals of 10°, by applying a light having a wavelength of λ nm from the inclined direction of the sample.

With the in-plane slow axis from the normal line direction taken as the rotation axis thereof, when the sample has a zero retardation value at a certain inclination angle, then the symbol of the retardation value of the sample at an inclination angle larger than that inclination angle is changed to a negative one, and then applied to KOBRA 21ADH or WR for computation.

With the slow axis taken as the inclination axis (rotation axis) (in case where the sample has no slow axis, the rotation axis of the sample may be in any in-plane direction of the film), the retardation values of the sample are measured in any inclined two directions; and based on the data and the mean refractive index and the inputted thickness of the sample, Rth may be calculated according to the following formulas (X) and (XI):

$$Re(\theta) = \left[ nx - \frac{ny \times nz}{\sqrt{\left\{ny\sin\left(\sin^{-1}\left(\frac{\sin(-\theta)}{nx}\right)\right)\right\}^2 + \left\{nz\cos\left(\sin^{-1}\left(\frac{\sin(-\theta)}{nx}\right)\right)\right\}^2}}\right] \times \frac{d}{\cos\left\{\sin^{-1}\left(\frac{\sin(-\theta)}{nx}\right)\right\}} \qquad (X)$$

$$Rth = \{(nx + ny)/2 - nz\} \times d \qquad (XI)$$

wherein Re(θ) means the retardation value of the sample in the direction inclined by an angle θ from the normal line direction; nx means the in-plane refractive index of the sample in the slow axis direction; ny means the in-plane refractive index of the sample in the direction vertical to nx; nz means the refractive index of the sample vertical to nx and ny; and d is a thickness of the sample.

When the sample to be tested can not be represented by a monoaxial or biaxial index ellipsoid, or that is, when the sample does not have an optical axis, then its Rth(λ) may be calculated according to the method mentioned below.

With the in-plane slow axis (determined by KOBRA 21ADH or WR) taken as the inclination axis (rotation axis) of the sample, Re(λ) of the sample is measured at 11 points in all thereof, from −50° to +50° relative to the normal line direction of the sample at intervals of 10°, by applying a light having a wavelength of λ nm from the inclined direction of the sample. Based on the thus-determined retardation data of Re(λ), the mean refractive index and the inputted thickness of the sample, Rth(λ) of the sample is calculated with KOBRA 21ADH or WR.

The mean refractive index may be used values described in catalogs for various types of optical films. When the mean refractive index has not known, it may be measured with Abbe refractometer. The mean refractive index for major optical film is described below: cellulose acetate (1.48), cycloolefin polymer (1.52), polycarbonate (1.59), polymethylmethacrylate (1.49), polystyrene (1.59).

The mean refractive index and the film thickness are inputted in KOBRA 21ADH or WR, nx, ny and nz are calculated therewith. From the thus-calculated data of nx, ny and nz, Nz=(nx−nz)/(nx−ny) is further calculated.

In the specification, "slow axis" of the retardation film and others means the direction in which the refractive index is the largest. The term "Visible light region" is from 380 nm to 780 nm. Unless otherwise specifically indicated, the wavelength at which a refractive index is measured is λ=550 nm in a visible light region.

In this description, the numerical data, the numerical ranges and the qualitative expressions (for example, expressions of "equivalent", "equal") should be interpreted to indicate the numerical data, the numerical ranges and the properties including errors that are generally acceptable for liquid-crystal display devices and their constitutive members.

A simple outline view of one example of the liquid-crystal display device of the invention is shown in FIG. 1. In FIG. 1, the top is a viewers' side of the device and the bottom is a backlight side thereof.

The VA-mode liquid-crystal display device shown in FIG. 1 comprises a liquid-crystal cell LC (comprising an upper substrate 1, a lower substrate 3 and a liquid-crystal layer 5), and a pair of upper polarizing plate P1 and lower polarizing plate P2 disposed to sandwich the liquid-crystal cell LC therebetween. In general, a polarizing film is built in a liquid-crystal display device as a polarizing plate having a protective film on both surfaces of the polarizing film; but in FIG. 1, the outer protective film of the polarizing film is omitted. The polarizing plates P1 and P2 each have polarizing films 8a and 8b, respectively; and they are so disposed that their absorption axes 9a and 9b are perpendicular to each other. The liquid-crystal cell LC is a VA-mode liquid-crystal cell; and in the black state, the liquid-crystal layer 5 is in homeotropic alignment, as in FIG. 1. The upper substrate 1 and the lower substrate 3 each have an alignment film (not shown) and an electrode layer (not shown) on the inner face thereof, and the inner face of the substrate 1 on the viewers' side additionally has a color filter layer (not shown).

Between the upper substrate 1 and the upper polarizing film 8a, and between the lower substrate 3 and the lower polarizing film 8b, retardation films 10a and 10b, respectively, are disposed. The retardation films 10a and 10b satisfy the following formulas (I) to (IV), and their optical anisotropy is equivalent, or that is, their Re and Rth are equal to each other.

$$30 \text{ nm} \leq Re(550) \leq 80 \text{ nm} \quad \text{(I)}$$

$$70 \text{ nm} \leq Rth(550) \leq 140 \text{ nm} \quad \text{(II)}$$

$$Re(450)/Re(550) < 1 \quad \text{(III)}$$

$$Re(650)/Re(550) > 1 \quad \text{(IV)}$$

The retardation films 10a and 10b are so disposed that their in-plane slow axes 11a and 11b each are perpendicular to the absorption axes 9a and 9b of the upper polarizing film 8a and the lower polarizing film 8b, respectively. Specifically, the retardation films 10a and 10b are so disposed that their slow axes are perpendicular to each other.

The retardation films 10a and 10b each are a cellulose acylate film containing at least a cellulose acylate and a liquid-crystal compound. The retardation films 10a and 10b may serve as a protective film for the polarizing films 8a and 8b, respectively. Needless-to-say, a protective film may be additionally disposed between the retardation films 10a and 10b, and the polarizing films 8a and 8b; and in case where the protective film is disposed, it is preferably an isotropic film having retardation of nearly 0 (zero), such as a cellulose acylate film described in JPA No. 2005-138375.

The liquid-crystal display device of the invention satisfies the requirement of thickness reduction; and in the prior-art technique, Δnd of a liquid-crystal layer (Δn: birefringence of liquid crystal, d: layer thickness) is 350 nm or so, but in the liquid-crystal display of FIG. 1, Δnd of the liquid-crystal layer 5 can be from 250 to 345 nm or so.

Figure 2:
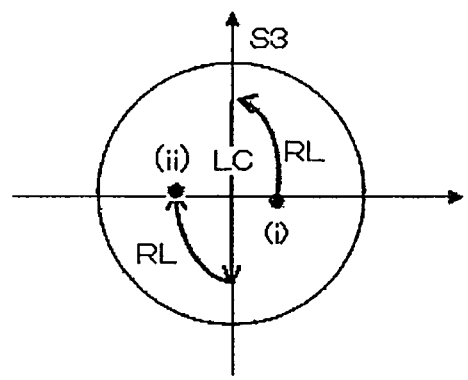
FIG. 2 is a view showing one example of the optical compensation mechanism of a VA-mode liquid-crystal display device having the constitution shown in FIG. 1, on a Poincare sphere.
Figure 3:
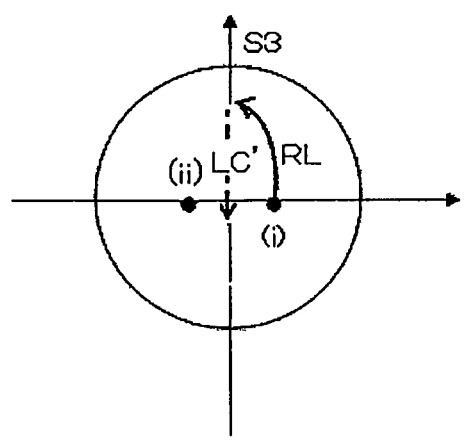
FIG. 3 is a view showing one example of the optical compensation mechanism of a VA-mode liquid-crystal display device having the constitution shown in FIG. 1, on a Poincare sphere.

In an example employing the same optical compensation principle as in the VA-mode liquid-crystal display device shown in FIG. 1, or that is, in an example where the birefringence of the liquid-crystal cell LC in the black state to occur in the oblique direction is compensated by Re and Rth of the two retardation films (in FIGS. 1, 10a and 10b) that have equivalent optical anisotropy and are disposed symmetrically relative to the center of the liquid-crystal cell (in FIG. 1, LC), when the change in polarization state is expressed as the rotation on a Poincare sphere, then it may be, for example, as in FIG. 2. The Poincare sphere is a three-dimensional map that describes a polarization state, and the equator of the sphere indicates a polarization state of a linear polarized light having an ellipticity of 0. FIG. 2 is a view showing a Poincare sphere in the positive direction of the S2 axis thereof. The point (i) in FIG. 2 indicates a polarization state of a linear polarized light, which passes through a polarizing film disposed at the backlight side after entering a liquid crystal display device in the black state in the oblique direction; and when the polarization state point (i) is converted into a polarization state point (ii) which is an extinction point on the S1 axis, then the device may be free from a problem of contrast reduction in the oblique direction. RL indicates the trace of a polarization state of light that passes through the retardation films symmetrically disposed on and below the liquid-crystal cell; and LC indicates the trace of a polarization state of light that passes through the liquid-crystal cell. Heretofore, in a VA-mode liquid-crystal display device in which retardation films having equivalent optical anisotropy are vertically symmetrically disposed as in FIG. 1, the polarization state of the incident light is converted as a point-symmetric trace as in FIG. 2, thereby reducing the light leakage from the device in the black state in oblique directions. When the thickness of the liquid-crystal layer is reduced so that the device can be thinned as in the invention, Δnd of the liquid-crystal layer becomes small and the length of the arrow of LC indicating the trace of the conversion of the polarization state of light that passes through the liquid-crystal layer is thereby shortened. For example, even when optical compensation is tried in the same constitution of a thinned liquid-crystal layer (LC') as in FIG. 3, directly using a conventional retardation film as it is, then it is difficult to convert the point (i) to the point (ii) with the symmetric trace as in FIG. 2, since the arrow LC' is shorter than the arrow LC. Accordingly, in the invention, retardation films satisfying the above-mentioned formulas (I) and (II) (in FIGS. 1, 10a and 10b) are used, to thereby achieve a polarization state conversion mode around a different rotation axis at a different rotation angle as in FIG. 4, or that is, differing from those achieved bypassing through conventional retardation films, and therefore as a whole, the invention has enabled the polarization state conversion with the point-symmetric trace like conventionally, and has succeeded in reducing the light leakage from the device in the black state in oblique directions. From this viewpoint, according to the invention, Re(550) of the retardation film is preferably from 30 to 80 nm, more preferably from 40 to 70 nm; Rth(550) of the retardation film is preferably from 70 to 140 nm, more preferably from 80 to 130 nm.

Further according to the invention, the retardation films (in FIGS. 1, 10a and 10b) satisfy the above-mentioned formulas (III) and (IV), or that is, the retardation films have reversed wavelength dispersion characteristics of retardation Re within a visible light region, and therefore the color shift of the device in the black state in oblique directions is thereby reduced. The change in the polarization state of light passing through a retardation region is expressed by rotation at a specific angle around a specific axis determined in accordance with the optical characteristics, Nz value (concretely, the value to be obtained by adding 0.5 to Rth/Re) within the retardation region, on a Poincare sphere. The rotation angle (degree of rotation) is proportional to the retardation in the retardation region though which the incident light has passed, and is proportional to the reciprocal number of the wavelength of the incident light; and for example, when a retardation film having a flat Re not depending on the wavelength of light is used, then the light having a shorter wavelength may rotate more largely while passing through the retardation film, but the light having a longer wavelength may rotate smaller. As a result, even when the optical characteristics of the retardation film are optimized so that the polarization state of G light, having an intermediate wavelength in a visible light region (about 550 nm), is converted into an extinction point, the polarization state of R light, having a longer wavelength (about 650 nm), or B light, having a shorter wavelength (about 450 nm), may not be converted into the extinction point. Therefore, the device may still have a problem of color shift in oblique direction. Accordingly, in the invention, retardation films having reversed wavelength dispersion characteristics of retardation Re, or that is, having the optical characteristics that Re becomes smaller at a shorter wavelength are used so as to cancel the retardation condition change that occurs depending on the wavelength of the incident light, therefore reducing the color shift in oblique directions.

In the invention, from the same viewpoint as above, it is desirable that the retardation films (10a and 10b in FIG. 1) also have reversed wavelength dispersion characteristics of Rth in a visible light region, concretely satisfying the following formulas (V) and (VI):

$$Rth(450)/Rth(550)<1 \tag{V}$$

$$Rth(650)/Rth(550)>1 \tag{VI}$$

wherein $Rth(\lambda)$ means the retardation [nm] of the film in the thickness-direction, measured at a wavelength $\lambda$ [nm].

Figure 4:
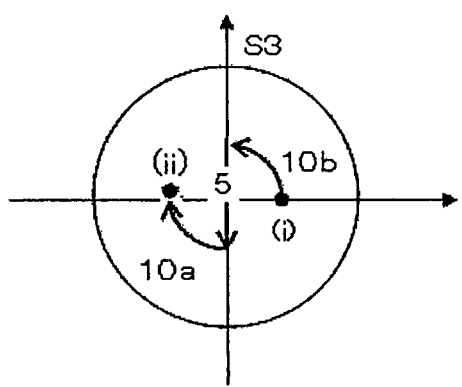
FIG. 4 is a view showing one example of the optical compensation mechanism of one embodiment of a VA-mode liquid-crystal display device of the invention shown in FIG. 1, on a Poincare sphere.

Further, according to the invention, when the retardation films (10a and 10b in FIG. 1) satisfy the following formula (VII), then they do not produce the movement of RL on the Poincare sphere of FIG. 2, but may produce polarization conversion around a specific axis, 10a and 10b in FIG. 4; and the retardation films of the type are therefore favorable as still enabling optical compensation even though the liquid-crystal layer is thinner.

$$1.2 \leq Rth(550)/Re(550) \leq 2.6 \tag{VII}$$

From the same viewpoint, Rth(550)/Re(550) is more preferably from 1.3 to 2.6, even more preferably from 1.4 to 2.6.

In the invention, it is also desirable that the liquid-crystal layer (5 in FIG. 1) in the liquid-crystal cell and the retardation films (10a and 10b in FIG. 1) satisfy the following formula (VIII) in the black state. This is because the films that produce the movement of RL on the Poincare sphere of FIG. 3 could hardly attain optical compensation of the liquid-crystal layer LC'; but even though the thickness is thinner than LC' like the liquid-crystal layer 5, the films still enable the movement like 10a and 10b in FIG. 4, and therefore they may favorably attain the intended optical compensation.

$$0.7 \leq (2 \times Rth(550))/\Delta n(550) \times d \leq 1.3 \tag{VIII}$$

In the formula, $\Delta n(550)$ means the intrinsic birefringence at 550 nm of the liquid crystal in the liquid-crystal layer; d means the thickness of the liquid-crystal layer; Rth(550) means retardation along thickness direction of the retardation film at 550 nm.

One preferable embodiment of the invention is an embodiment of a VA-mode liquid-crystal display device. Of the VA-mode, more preferred is a multidomain structure in which one pixel is divided into plural regions, as the horizontal and vertical viewing angle characteristics of the structure are averaged and its display quality is good.

Depending on the driving mode thereof, the liquid-crystal display device of the invention includes different applications of an active matrix liquid-crystal display device comprising a 3-terminal or 2-terminal semiconductor element such as TFT (thin film transistor) or MIM (metal insulator metal), and a passive matrix liquid-crystal display device such as typically an STN-mode referred to as time sharing drive; and the invention is effective in all of these.

Various parts constituting the liquid-crystal display device of the invention are described in detail hereinunder.

[Retardation Film]

The retardation film for use in the liquid-crystal display device of the invention satisfies the above-mentioned formulas (I) to (IV). Heretofore, a cellulose acylate film comprising a cellulose acylate as the main ingredient thereof could hardly satisfy the optical characteristics of the above formulas (I) and (II). For example, in the technique described in the above-mentioned Japanese Patent No. 3330574 and EP-A 0911656A2, when Re is increased so as to satisfy the formula (I), then Rth may overstep the uppermost limit (140 nm) of the formula (II); and therefore, a cellulose acylate film satisfying both the formulas (I) and (II) is difficult to produce. Even though the film could be produced, it is problematic in that it is extremely thick. According to the invention, by adding a liquid-crystal compound thereto, it is possible to provide a cellulose acylate film satisfying the above formulas (I) and (II).

Cellulose Acylate:

Examples of the cellulose acylate material to be used for preparing the retardation film include triacetyl cellulose. The cellulose material for cellulose acylate includes cotton liter and wood pulp (hardwood pulp, softwood pulp), and cellulose acylate obtained from any such cellulose material is usable herein. As the case may be, those cellulose materials may be mixed for use herein. The cellulose materials are described in detail, for example, in Marusawa & Uda's "Plastic Material Lecture (17), Cellulose Resin" by Nikkan Kogyo Shinbun (1970) and Hatsumei Kyokai's Disclosure Bulletin 2001-1745 (pp. 7-8), and those celluloses described therein may be usable herein. There should not be any specific limitation to the cellulose acylate film for use in the invention.

The degree of substitution of cellulose acylate means the degree of acylation of three hydroxyl groups existing in the constitutive unit (($\beta$)1,4-glycoside-bonding glucose) of cellulose. The degree of substitution (degree of acylation) may be computed by measuring the bonding fatty acid amount per the constitutive unit mass of cellulose. The determination may be carried out according to "ASTM D817-91".

The degree of acetyl substitution of cellulose acylate to be used in producing the retardation film is described. From the viewpoint of expressing the optical characteristics, cellulose acetate having a lower degree of acetyl substitution may have an increased intrinsic birefringence; and therefore, the film having a small thickness may be controlled to have a desired retardation value when stretched at a lower draw ratio. On the other hand, from the viewpoint of the reversed wavelength dispersion characteristics of retardation thereof, the film having a higher degree of acetyl substitution may have increased reversed wavelength dispersion characteristics of retardation, since the cellulose acetate having a higher degree of acetyl substitution may have an increased density of acetyl side chains and therefore the polarizability component thereof that is perpendicular to the main chain of the polymer increases. From these viewpoints, the cellulose acylate to be used for producing the above-mentioned retardation films that are thin and satisfy the formulas (I) to (IV) is preferably a cellulose acetate having a degree of acetyl substitution of from 2.50 to 3.00, more preferably from 2.70 to 2.97. And the cellulose acylate having an acylate group(s) other than acetyl group in place of or along with the acetyl group(s) may be used. Cellulose acylates having at least one acylate group selected from the group consisting of acetyl, propionyl and butyryl are preferable; and cellulose acylates having at least two acylate group selected from the group consisting of acetyl, propionyl and butyryl are more preferable.

Preferably, the cellulose acylate has a weight-average degree of polymerization of from 350 to 800, more preferably from 370 to 600. Also preferably, the cellulose acylate for use in the invention has a number-average molecular weight of from 70000 to 230000, more preferably from 75000 to 230000, even more preferably from 78000 to 120000.

The cellulose acylate may be produced, using an acid anhydride or an acid chloride as the acylating agent for it. One most general production method for producing the cellulose acylate on an industrial scale comprises esterifying cellulose obtained from cotton linter, wood pulp or the like with a mixed organic acid component comprising an organic acid corresponding to an acetyl group and other acyl group (acetic acid, propionic acid, butyric acid) or its acid anhydride (acetic anhydride, propionic anhydride, butyric anhydride).

The cellulose acylate film is preferably produced according to a solvent-casting method. Examples of production of cellulose acylate film according to a solvent-casting method are given in U.S. Pat. Nos. 2,336,310, 2,367,603, 2,492,078, 2,492,977, 2,492,978, 2,607,704, 2,739,069 and 2,739,070, British Patents 640731, 736892, JP-B 45-4554, 49-5614, and JPA Nos. syo 60-176834, syo 60-203430, and syo 62-115035, and their descriptions are referred to herein. The cellulose acylate film may be stretched. Regarding the method and condition for stretching treatment, for example, referred to are JPA Nos. syo 62-115035, hei 4-152125, hei 4-284511, hei 4-298310, and hei 11-48271.

It is to be noted that when the cellulose acylate film is prepared according to a solvent casting method, any additive such as a liquid crystal compound may be added to a cellulose acylate solution. For example, a solution which is prepared by dissolving a liquid crystal compound in an organic solvent may be added to a cellulose acylate solution.

The retardation film preferably contains the cellulose acylate as a main ingredient.

Liquid-Crystal Compound:

In the invention, for producing the cellulose acylate film that satisfies the above-mentioned requirements for retardation film, at least one liquid-crystal compound serving as an Re enhancer is added to the cellulose acylate film. "Re enhancer" as referred to herein is a compound having the property of expressing birefringence in plane of film.

The liquid-crystal compound for use in the invention expresses a liquid-crystal phase preferably within a temperature range of from 100° C. to 300° C., more preferably from 120° C. to 250° C. The liquid-crystal phase is preferably a columnar phase, a nematic phase or a smectic phase, more preferably a nematic phase or a smectic phase.

In the invention, plural liquid-crystal compounds may be used. In that case, it is desirable that the mixture of plural liquid-crystal compounds still exhibits liquid crystallinity, and preferably, even the mixture could form the same liquid-crystal phase as the liquid-crystal phase of the individual liquid-crystal compounds.

In this description, the evaluation for liquid crystallinity of the liquid-crystal compound to be used as a retardation enhancer may be attained as follows: Using a polarizing microscope Eclipse E600POL (by Nikon), a compound is visually checked for the liquid-crystal condition thereof, and its phase transition temperature is measured. For the temperature control, used is a hot stage FP82HT (by Mettler Toledo) connected to FP90 (by Mettler Toledo), and from the optical texture change observed with a polarizing microscope, the liquid-crystal phase is identified.

A liquid-crystal compound is metered and taken into a sample bottle, and this is dissolved in an organic solvent (e.g., methylene chloride) to form a uniform solution, and then the solvent is removed by evaporation.

A sample of the compound for evaluation for liquid crystallinity, prepared in the manner as above, is sandwiched between a slide glass and a cover glass, and on the hot stage, this is heated at a speed of 10° C./min, whereupon the change of the sample with the lapse of time is observed with the polarizing microscope.

As a result, when the liquid crystal compound forms a liquid-crystal phase, then it is judged that the compound has liquid crystallinity; and when it does not form a uniform liquid-crystal phase but forms an isotropic phase or an ununiform phase, then it is judged that the compound does not have liquid crystallinity.

The cellulose acylate film to be used as the retardation film preferably comprises at least one compound represented by the formula (A) as an Re enhancer. By adding the compound represented by formula (A) thereto, it is possible to prepare a cellulose acylate film having enhanced retardation and reversed wavelength dispersion characteristics of retardation.

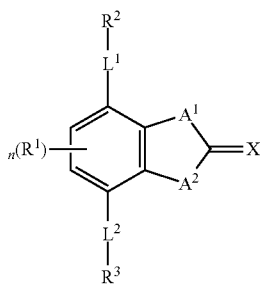

Formula (A)

In the formula, $L^1$ and $L^2$ independently represent a single bond or a divalent linking group; $A^1$ and $A^2$ independently represent a group selected from the group consisting of —O—, —NR— where R represents a hydrogen atom or a substituent, —S— and —CO—; $R^1$, $R^2$ and $R^3$ independently represent a substituent; X represents a nonmetal atom selected from the groups 14-16 atoms, provided that X may bind with at least one hydrogen atom or substituent; and n is an integer from 0 to 2.

Among the compounds represented by the formula (A), the compounds represented by the formula (B) are preferred as a retardation enhancer.

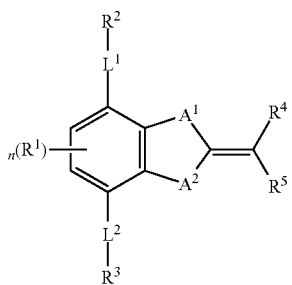

Formula (B)

In the formula (B), $L^1$ and $L^2$ independently represent a single bond or a divalent group. $A^1$ and $A^2$ independently represent a group selected from the group consisting of —O—, —NR— where R represents a hydrogen atom or a substituent, —S— and —CO—. $R^1$, $R^2$ and $R^3$ independently represent a substituent. And n is an integer from 0 to 2.

Preferred examples of the divalent linking group represented by $L^1$ or $L^2$ in the formula (A) or (B) include those shown below.

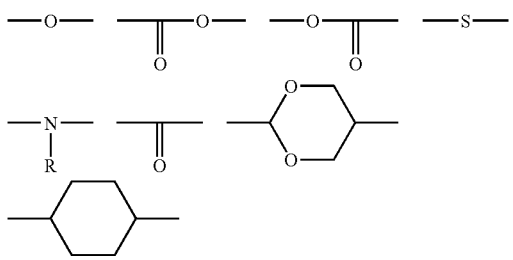

And further preferred are —O—, —COO— and —OCO—.

In the formulas (A) and (B), $R^1$ represents a substituent, if there are two or more R, they may be same or different from each other, or form a ring. Examples of the substituent include those shown below.

Halogen atoms such as fluorine, chlorine, bromine and iodine atoms; alkyls (preferably $C_{1-30}$ alkyls) such as methyl, ethyl, n-propyl, iso-propyl, tert-butyl, n-octyl, and 2-ethylhexyl; cylcoalkyls (preferably $C_{3-30}$ substituted or non-substituted cycloalkyls) such as cyclohexyl, cyclopentyl and 4-n-dodecylcyclohexyl; bicycloalkyls (preferably $C_{5-30}$ substitute or non-substituted bicycloalkyls, namely monovalent residues formed from $C_{5-30}$ bicycloalkanes from which a hydrogen atom is removed) such as bicyclo[1,2,2]heptane-2-yl and bicyclo[2,2,2]octane-3-yl; alkenyls (preferably $C_{2-30}$ alkenyls) such as vinyl and allyl; cycloalkenyls (preferably $C_{3-30}$ substituted or non-substituted cycloalkenyls, namely monovalent residues formed from $C_{3-30}$ cycloalkenes from which a hydrogen atom is removed) such as 2-cyclopentene-1-yl and 2-cyclohexene-1-yl; bicycloalkenyls (preferably $C_{5-30}$ substituted or non-substituted bicycloalkenyls, namely monovalent residues formed from $C_{5-30}$ bicycloalkenes from which a hydrogen atom is removed) such as bicyclo[2,2,1]hepto-2-en-1-yl and bicyclo[2,2,2]octo-2-en-4-yl; alkynyls (preferably $C_{2-30}$ substitute or non-substituted alkynyls) such as etynyl and propargyl; aryls (preferably $C_{6-30}$ substitute or non-substituted aryls) such as phenyl, p-tolyl and naphthyl; heterocyclic groups (preferably (more preferably $C_{3-30}$) substituted or non-substituted, 5-membered or 6-membered, aromatic or non-aromatic heterocyclic monovalent residues) such as 2-furyl, 2-thienyl, 2-pyrimidinyl and 2-benzothiazolyl; cyano, hydroxyl, nitro, carboxyl, alkoxys (preferably $C_{1-30}$ substituted or non-substituted alkoxys) such as methoxy, ethoxy, iso-propoxy, t-butoxy, n-octyloxy and 2-methoxyethoxy; aryloxys (preferably $C_{6-30}$ substituted or non-substituted aryloxys) such as phenoxy, 2-methylphenoxy, 4-t-butylphenoxy, 3-nitrophenoxy and 2-tetradecanoyl aminophenoxy; silyloxys (preferably $C_{3-20}$ silyloxys) such as trimethylsilyloxy and t-butyldimethylsilyloxy; hetero-cyclic-oxys (preferably $C_{2-30}$ substituted or non-substituted hetero-cyclic-oxys) such as 1-phenyltetrazole-5-oxy and 2-tetrahydropyrenyloxy; acyloxys (preferably $C_{2-30}$ substitute or non-substituted alkylcarbonyloxys and $C_{6-30}$ substituted or non-substituted arylcarbonyloxys) such as formyloxy, acetyloxy, pivaloyloxy, stearoyoxy, benzoyloxy and p-methoxyphenylcarbonyloxy; carbamoyloxys (preferably $C_{1-30}$ substituted or non-substituted carbamoyloxys) such as N,N-dimethyl carbamoyloxy, N,N-diethyl carbamoyloxy, morpholinocarbonyloxy, N,N-di-n-octylaminocarbonyloxy and N-n-octylcarbamyloxy; alkoxy carbonyloxys (preferably $C_{2-30}$ substituted or non-substituted alkoxy carbonyloxys) such as methoxy carbonyloxy, ethoxy carbonyloxy, t-butoxy carbonyloxy and n-octyloxy carbonyloxy; aryloxy carbonyloxys (preferably $C_{7-30}$ substituted or non-substituted aryloxy carbonyloxys) such as phenoxy carbonyloxy, p-methoxyphenoxy carbonyloxy and p-n-hexadecyloxyphenoxy carbonyloxy; aminos (preferably $C_{0-30}$ substituted or non-substituted alkylaminos and $C_{6-30}$ substituted or non-substituted arylaminos) such as amino, methylamino, dimethylamino, anilino, N-methyl-anilino and diphenylamino; acylaminos (preferably $C_{1-30}$ substituted or non-substituted alkylcarbonylaminos and $C_{6-30}$ substituted or non-substituted arylcarbonylaminos) such as formylamino, acetylamino, pivaloylamino, lauroylamino and benzoylamino; aminocarbonylaminos (preferably $C_{1-30}$ substituted or non-substituted aminocarbonylaminos) such as carbamoylamino, N,N-dimethylaminocarbonylamino, N,N-diethylamino carbonylamino and morpholino carbonylamino; alkoxycarbonylaminos (preferably $C_{2-30}$ substituted or non-substituted alkoxycarbonylaminos) such as methoxycarbonylamino, ethoxycarbonylamino, t-butoxycarbonylamino, n-octadecyloxycarbonylamino and N-methyl-methoxy carbonylamino; aryloxycarbonylaminos (preferably $C_{7-30}$ substituted or non-substituted aryloxycarbonylaminos) such as phenoxycarbonylamino, p-chloro phenoxycarbonylamino and m-n-octyloxy phenoxy carbonylamino; sulfamoylaminos (preferably $C_{0-30}$ substituted or non-substituted sulfamoylaminos) such as sulfamoylamino, N,N-dimethylamino sulfonylamino and N-n-octylamino sulfonylamino; alkyl- and aryl-sulfonylaminos (preferably $C_{1-30}$ substituted or non-substituted alkyl-sulfonylaminos and $C_{6-30}$ substituted or non-substituted aryl-sulfonylaminos) such as methyl-sulfonylamino, butyl-sulfonylamino, phenyl-sulfonylamino, 2,3,5-trichlorophenyl-sulfonylamino and p-methylphenyl-sulfonylamino; mercapto; alkylthios (preferably substituted or non-substituted $C_{1-30}$ alkylthios such as methylthio, ethylthio and n-hexadecylthio; arylthios (preferably $C_{6-30}$ substituted or non-substituted arylthios) such as phenylthio, p-chlorophenylthio and m-methoxyphenylthio; heterocyclic-thios (preferably $C_{2-30}$ substituted or non-substituted heterocyclic-thios such as 2-benzothiazolyl thio and 1-phenyltetrazol-5-yl-thio; sulfamoyls (preferably $C_{0-30}$ substituted or non-substituted sulfamoyls) such as N-ethylsulfamoyl, N-(3-dodecyloxypropyl)sulfamoyl, N,N-dimethylsulfamoyl, N-acetylsulfamoyl, N-benzoylsulfamoyl, N-(N'-phenylcarbamoyl)sulfamoyl; sulfo; alkyl- and aryl-sulfinyls (preferably $C_{1-30}$ substituted or non-substituted alkyl- or $C_{6-30}$ substituted or non-substituted aryl-sulfinyls) such as methylsulfinyl, ethylsulfinyl, phenylsulfinyl and p-methylphenylsulfinyl; alkyl- and aryl-sulfonyls (preferably $C_{1-30}$ substituted or non-substituted alkyl-sulfonyls and $C_{6-30}$ substituted or non-substituted arylsulfonyls) such as methylsulfonyl, ethylsulfonyl, phenylsulfonyl and p-methylphenylsulfonyl; acyls (preferably $C_{2-30}$ substituted non-substituted alkylcarbonyls, and $C_{7-30}$ substituted or non-substituted arylcarbonyls) such as formyl, acetyl and pivaloyl benzyl; aryloxycarbonyls (preferably $C_{7-30}$ substituted or non-substituted aryloxycarbonyls) such as phenoxycarbonyl, o-chlorophenoxycarbonyl, m-nitrophenoxycarbonyl and p-t-butylphenoxycarbonyl; alkoxycarbonyls (preferably $C_{2-30}$ substituted or non-substituted alkoxycarbonyls)methoxycarbonyl, ethoxycarbonyl, t-butoxycarbonyl and n-octadecyloxycarbonyl; carbamoyls (preferably $C_{1-30}$ substituted or non-substituted carbamoyls) such as carbamoyl, N-methylcarbamoyl, N,N-dimethylcarbamoyl, N,N-di-n-octylcarbamoyl and N-(methylsulfonyl)carbamoyl; aryl- and heterocyclic-azos (preferably $C_{6-30}$ substituted or non-substituted arylazos and $C_{3-30}$ substituted or non-substituted heterocyclicazos) such as phenylazo and p-chlorophenylazo, 5-ethylthio-1,3,4-thiadiazol-2-yl-azo, imides such as N-succinimide and N-phthalimide; phosphinos (preferably $C_{2-30}$ substituted or non-substituted phosphinos) such as dimethyl phosphino, diphenyl phosphino and methylphenoxy phosphino; phosphinyls (preferably $C_{2-30}$ substituted or non-substituted phosphinyls) such as phosphinyl, dioctyloxy phosphinyl and diethoxy phosphinyl; phosphinyloxys (preferably $C_{2-30}$ substituted or non-substituted phosphinyloxys) such as diphenoxyphosphinyloxy and dioctyloxyphosphinyloxy; phosphinylaminos (preferably $C_{2-30}$ substituted or non-substituted phosphinylaminos) such as dimethoxy phosphinylamino and dimethylamino phosphinylamino; and silyls (preferably $C_{3-30}$ substituted or non-substituted silyls) such as trimethylsilyl, t-butylmethylsilyl and phenyldimethylsilyl.

The substituents, which have at least one hydrogen atom, may be substituted by at least one substituent selected from these. Examples such substituent include alkylcarbonylaminosulfo, arylcarbonylaminosulfo, alkylsulfonylaminocarbonyl and arylsulfonylaminocarbonyl. More specifically, methylsulfonylaminocarbonyl, p-methylphenylsulfonylaminocarbonyl, acetylaminosulfonyl and benzoylaminosulfonyl are exemplified.

Preferably, $R^1$ represents a hydrogen atom, an alkyl group, an alkenyl group, an aryl group, a heterocyclic group, hydroxyl, carboxyl, an alkoxy group, an acyloxy group, cyano or an amino group; and more preferably, a halogen atom, an alkyl group, cyano or an alkoxy group.

$R^2$ and $R^3$ independently represent a substituent. Examples of the substituent include those exemplified above as examples of $R^1$. Preferably, $R^2$ and $R^3$ independently represent a substituted or non-substituted phenyl or a substituted or non-substituted cyclohexyl; more preferably, a substituted phenyl or a substituted cyclohexyl; and much more preferably, a phenyl having a substituent at a 4-position or a cyclohexyl having a substituent at a 4-position.

$R^4$ and $R^5$ independently represent a substituent. Examples of the substituent include those exemplified above as examples of $R^1$. Preferably, $R^4$ and $R^5$ independently represent an electron-attractant group having the Hammett value, $\sigma_p$, more than 0; more preferably an electron-attractant group having the Hammett value, $\sigma_p$, from 0 to 1.5. Examples of such an electron-attractant group include trifluoromethyl, cyano, carbonyl and nitro. $R^4$ and $R^5$ may bind to each other to form a ring.

It is to be noted that, regarding Hammett constant of the substituent, $\sigma_p$ and $\sigma_m$, there are detailed commentaries on the Hammett constant of the substituent, $\sigma_p$ and $\sigma_m$ in "Hammett Rule-Structure and Reactivity—(Hammeto soku-Kozo to Hanohsei)" published by Maruzen and written by Naoki Inamoto; "New Experimental Chemistry 14 Synthesis and Reaction of Organic Compound V (Shin Jikken Kagaku Koza 14 Yuuki Kagoubutsu no Gousei to Hannou)" on p. 2605, edited by Chemical Society of Japan and published by Maruzen; "Theory Organic Chemistry Review (Riron Yuuki Kagaku Gaisetsu)" on p. 217, published by TOKYO KAGAKU DOZIN CO. LTD., and written by Tadao Nakatani; and Chemical Reviews, Vol. 91, No. 2, pp. 165-195(1991).

In the formula, $A^1$ and $A^2$ independently represent a group selected from the group consisting of —O—, —NR— where R represents a hydrogen atom or a substituent, —S— and —CO—; and preferably, —O—, —NR— where R represents a substituent selected from those exemplified above as examples of $R^1$, or —S—.

In the formula, X represents a nonmetal atom selected from the groups 14-16 atoms, provided that X may bind with at least one hydrogen atom or substituent. Preferably, X represents =O, =S, =NR or =C(R)R where R represents a substituent selected from those exemplified as examples of $R^1$, and two of R may be same or different from each other.

More preferably, one R is cyano and another R is a substituted or non-substituted alkoxycarbonyl group.

In the formula, n is an integer from 0 to 2, and preferably 0 or 1.

Examples of the compound represented by the formula (A) or (B) include, but examples of the Re enhancer are not limited to, those shown below. Regarding the compounds shown below, each compound to which is appended (X) is referred to as "Example Compound (X)" unless it is specified.

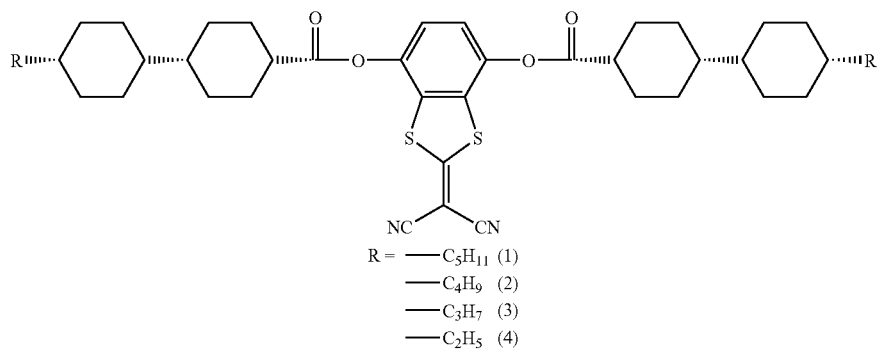
R = —C$_5$H$_{11}$ (1)
—C$_4$H$_9$ (2)
—C$_3$H$_7$ (3)
—C$_2$H$_5$ (4)
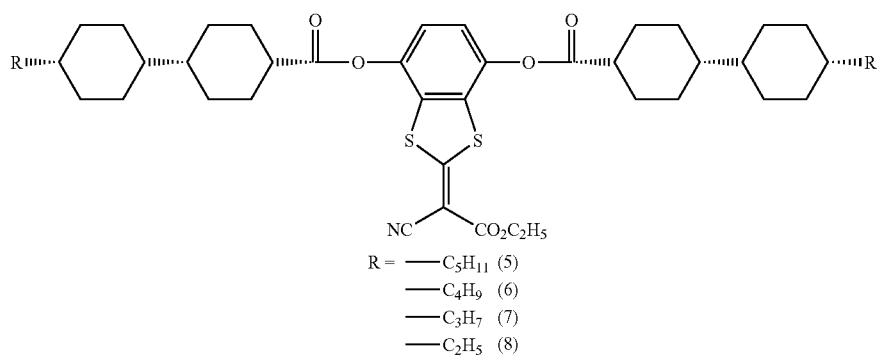
R = —C$_5$H$_{11}$ (5)
—C$_4$H$_9$ (6)
—C$_3$H$_7$ (7)
—C$_2$H$_5$ (8)
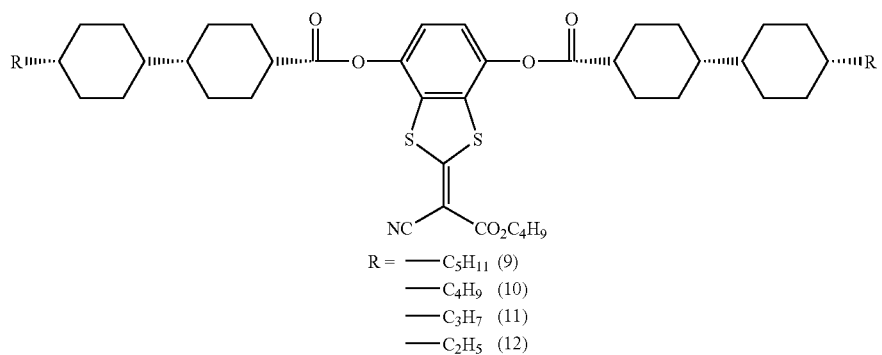
R = —C$_5$H$_{11}$ (9)
—C$_4$H$_9$ (10)
—C$_3$H$_7$ (11)
—C$_2$H$_5$ (12)
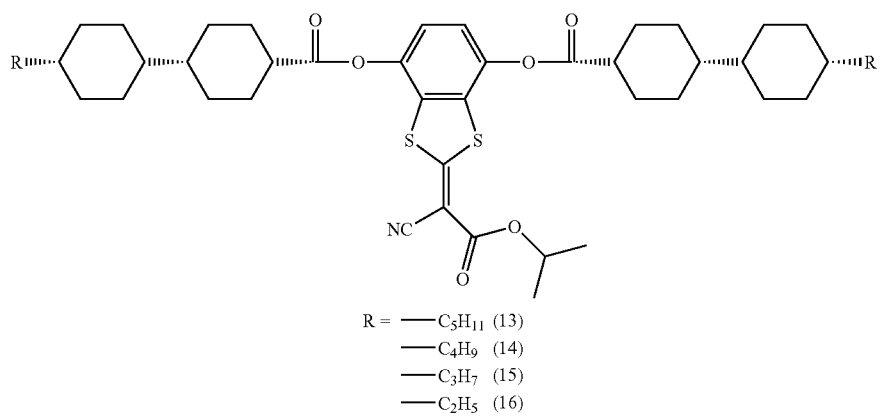
R = —C$_5$H$_{11}$ (13)
—C$_4$H$_9$ (14)
—C$_3$H$_7$ (15)
—C$_2$H$_5$ (16)

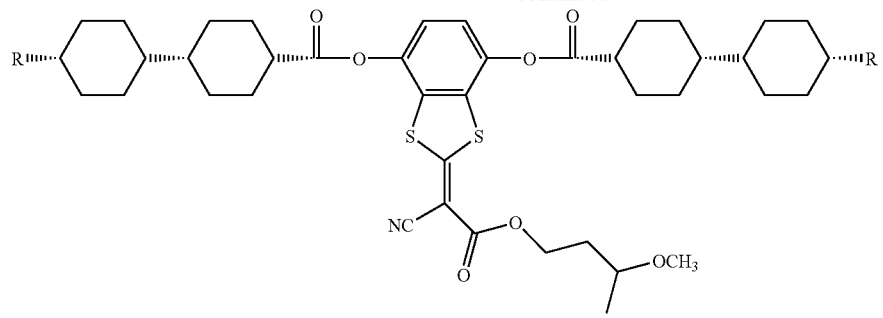
R = —C₅H₁₁ (17)
—C₄H₉ (18)
—C₃H₇ (19)
—C₂H₅ (20)
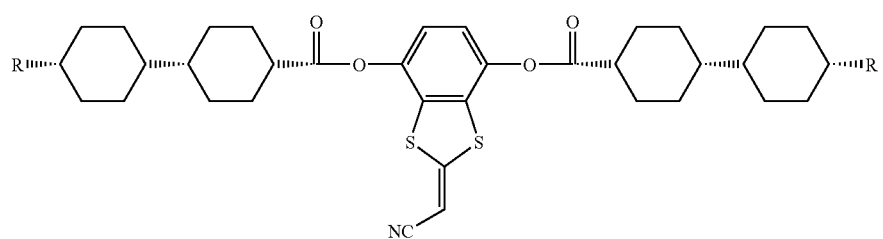
R = —C₅H₁₁ (21)
—C₄H₉ (22)
—C₃H₇ (23)
—C₂H₅ (24)
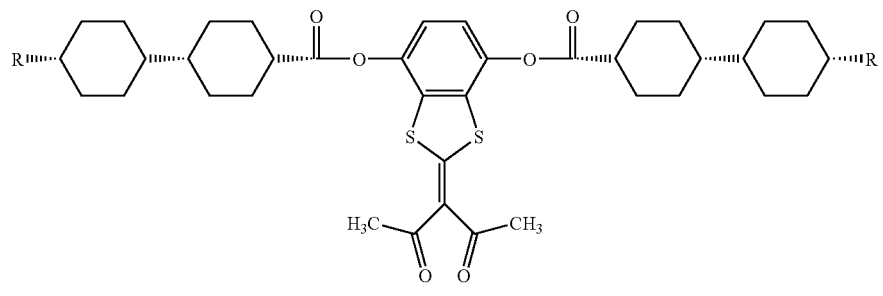
R = —C₅H₁₁ (25)
—C₄H₉ (26)
—C₃H₇ (27)
—C₂H₅ (28)
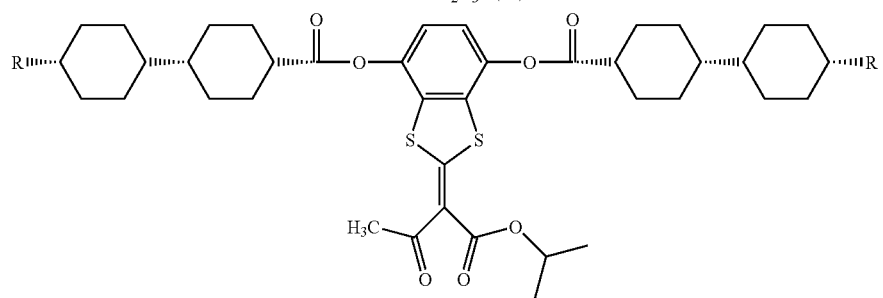
R = —C₅H₁₁ (29)
—C₄H₉ (30)
—C₃H₇ (31)
—C₂H₅ (32)

-continued
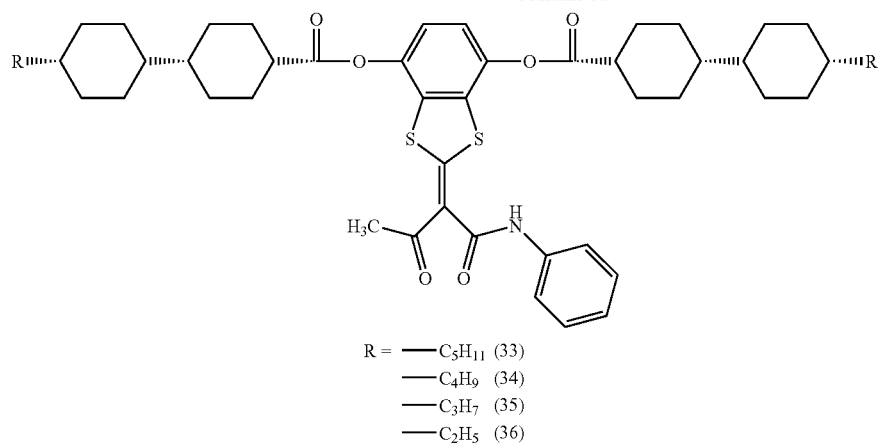
R = —C₅H₁₁ (33)
—C₄H₉ (34)
—C₃H₇ (35)
—C₂H₅ (36)
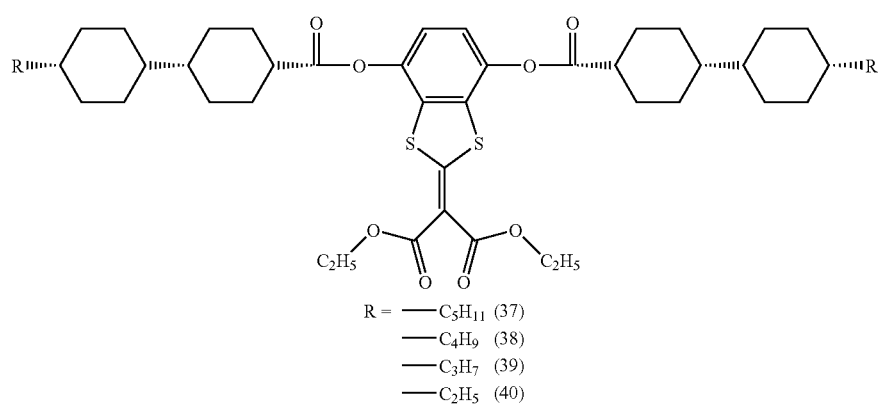
R = —C₅H₁₁ (37)
—C₄H₉ (38)
—C₃H₇ (39)
—C₂H₅ (40)
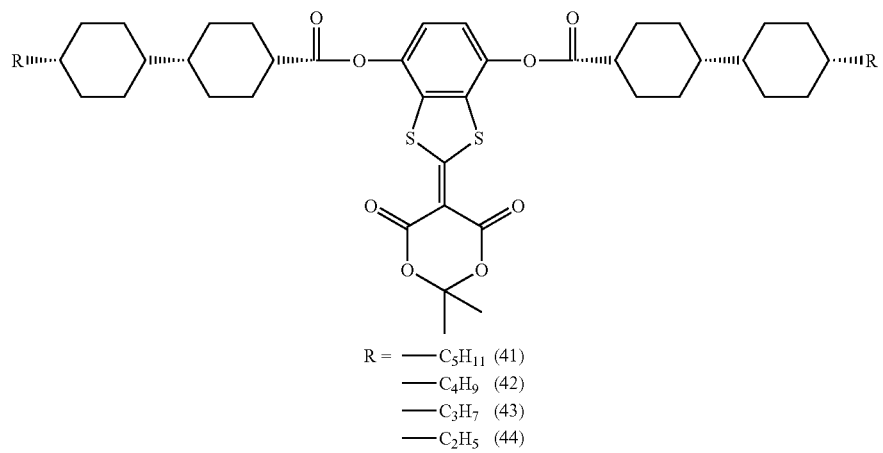
R = —C₅H₁₁ (41)
—C₄H₉ (42)
—C₃H₇ (43)
—C₂H₅ (44)

-continued
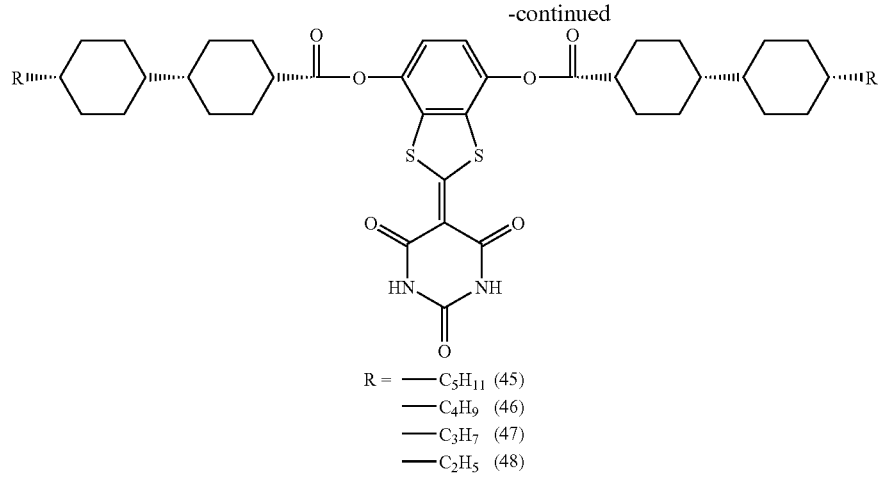
R = —C$_5$H$_{11}$ (45)
—C$_4$H$_9$ (46)
—C$_3$H$_7$ (47)
—C$_2$H$_5$ (48)
(49)
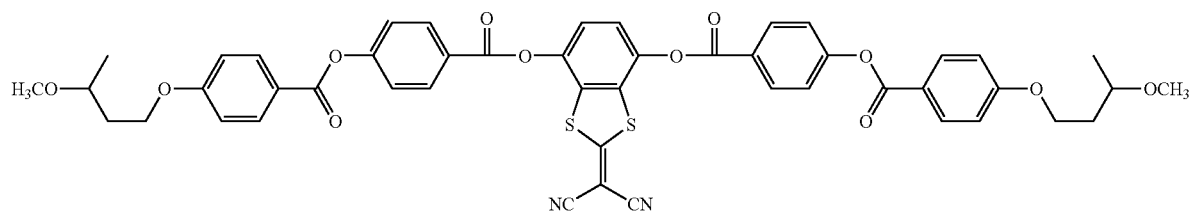
(50)
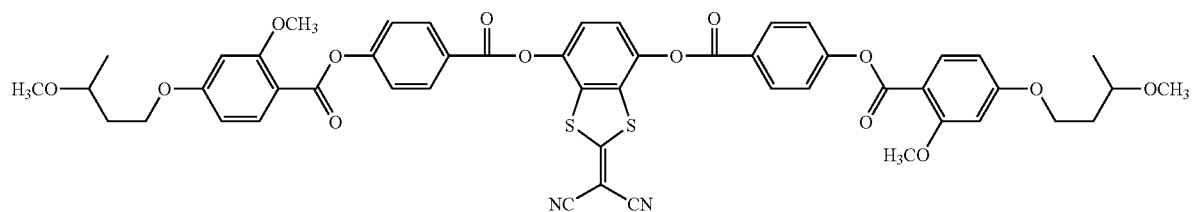
(51)
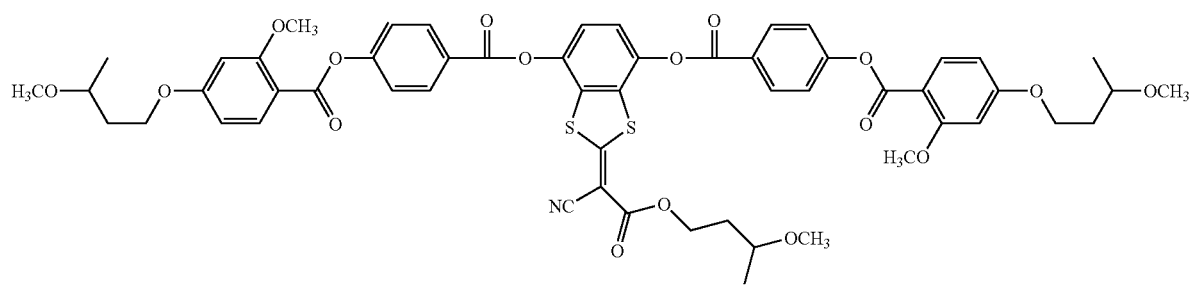
(52)
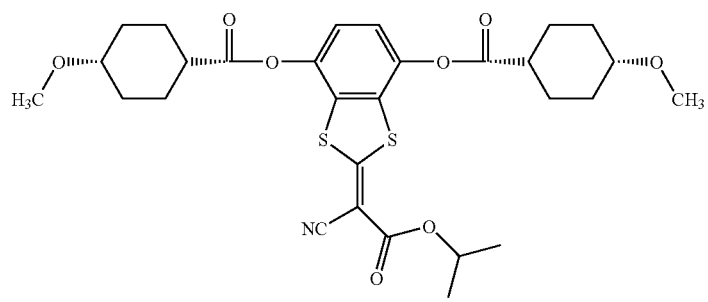

-continued
(53)
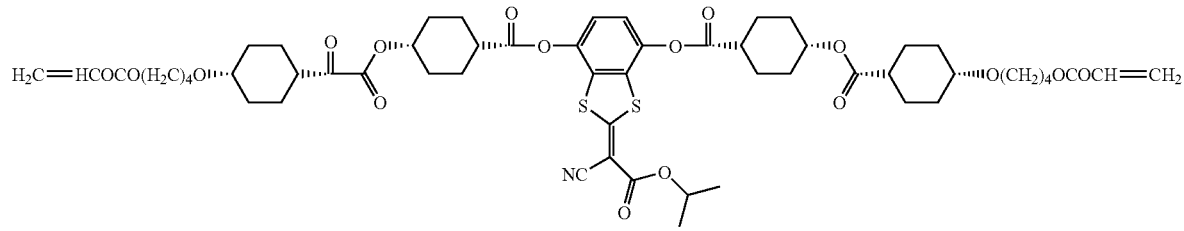
(54)
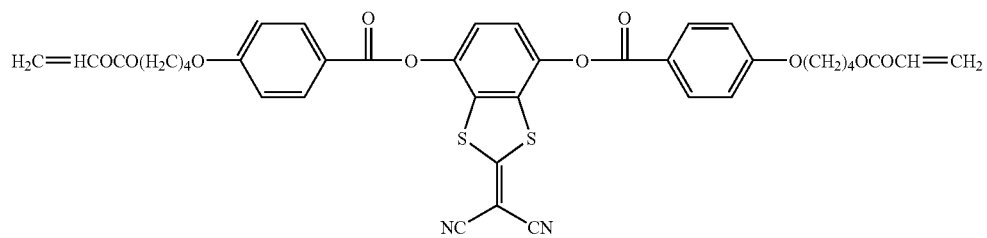
(55)
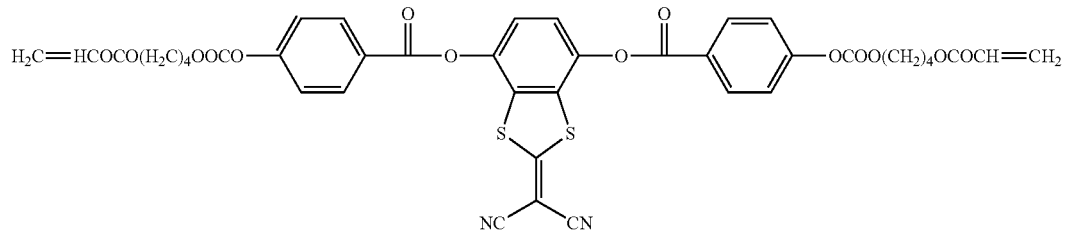
(56)
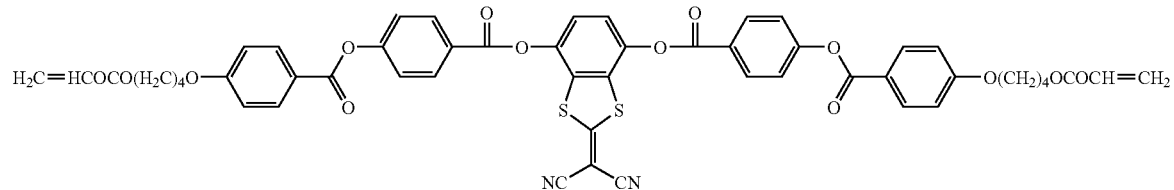
(57)
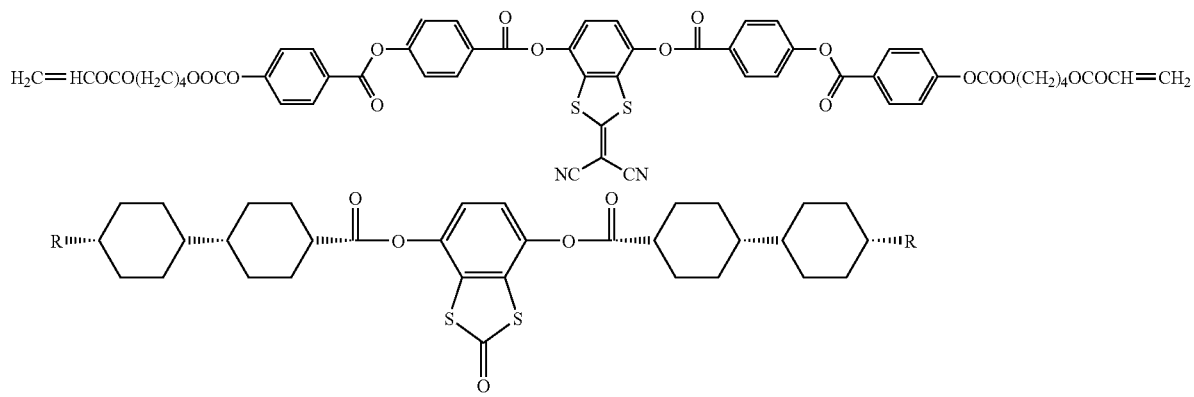
R = —C$_5$H$_{11}$ (58)
—C$_4$H$_9$ (59)
—C$_3$H$_7$ (60)
—C$_2$H$_5$ (61)

-continued
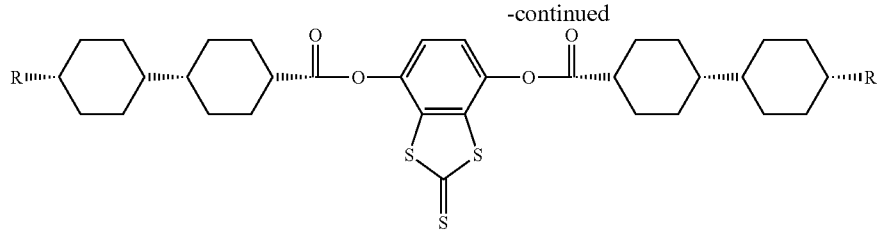
R = —C$_5$H$_{11}$ (62)
—C$_4$H$_9$ (63)
—C$_3$H$_7$ (64)
—C$_2$H$_5$ (65)
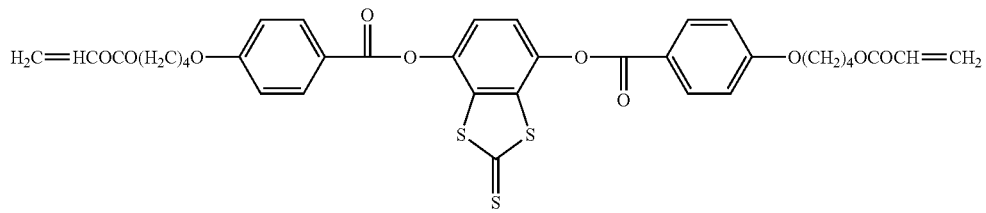
(66)
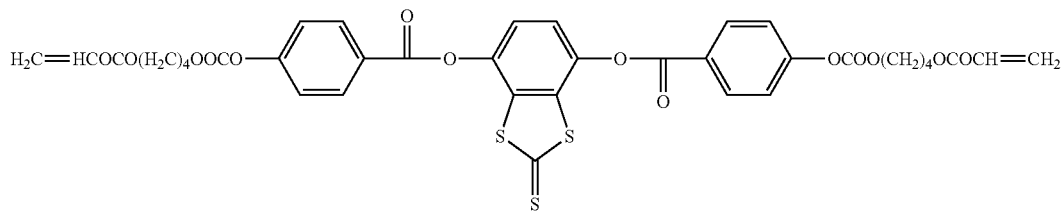
(67)
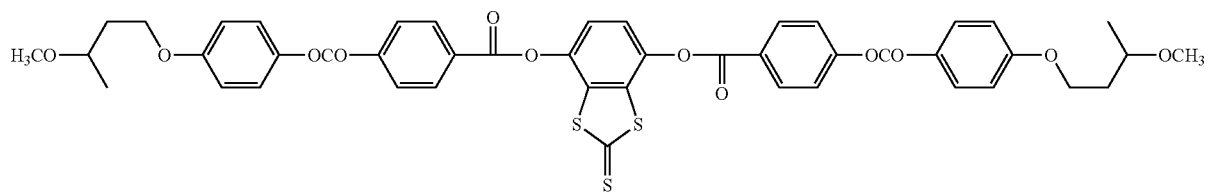
(68)
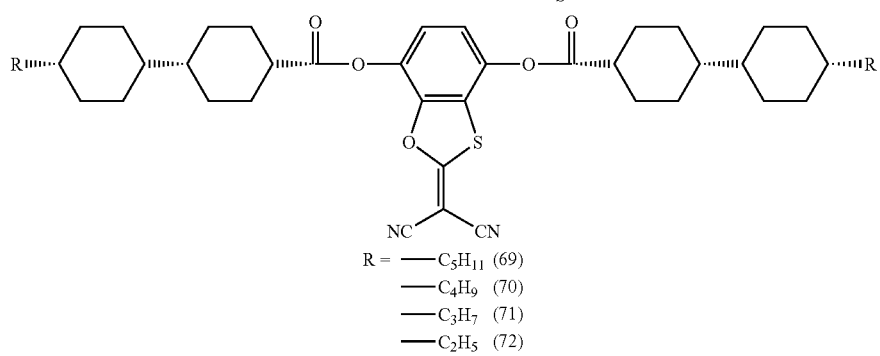
R = —C$_5$H$_{11}$ (69)
—C$_4$H$_9$ (70)
—C$_3$H$_7$ (71)
—C$_2$H$_5$ (72)
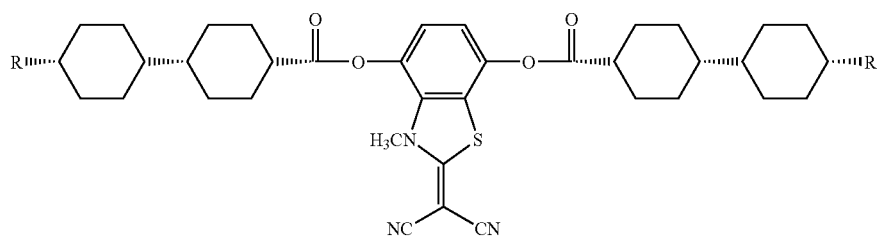
R = —C$_5$H$_{11}$ (73)
—C$_4$H$_9$ (74)
—C$_3$H$_7$ (75)
—C$_2$H$_5$ (76)

-continued
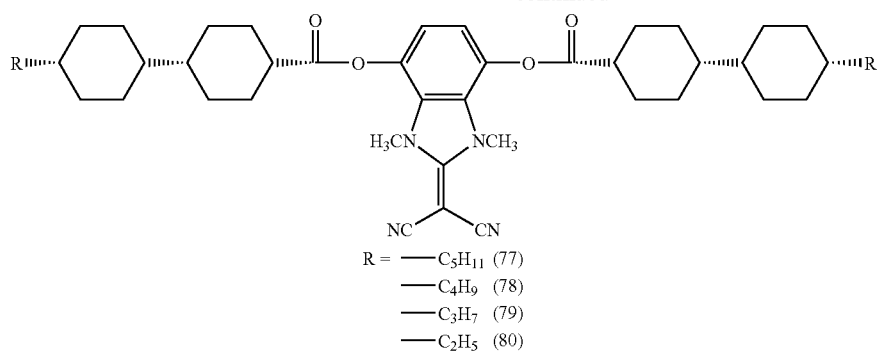
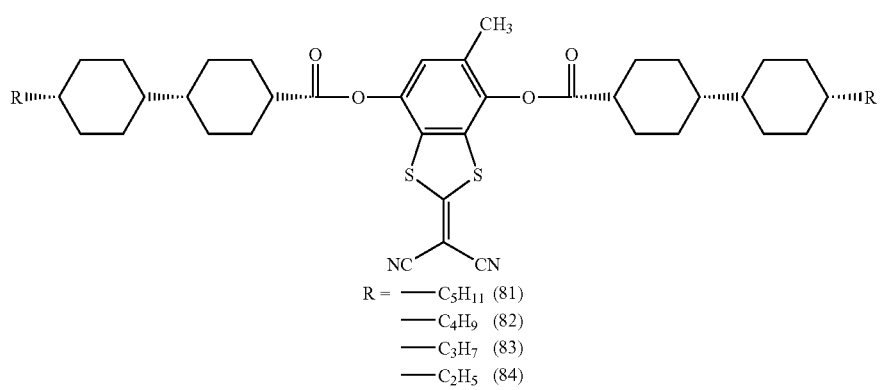
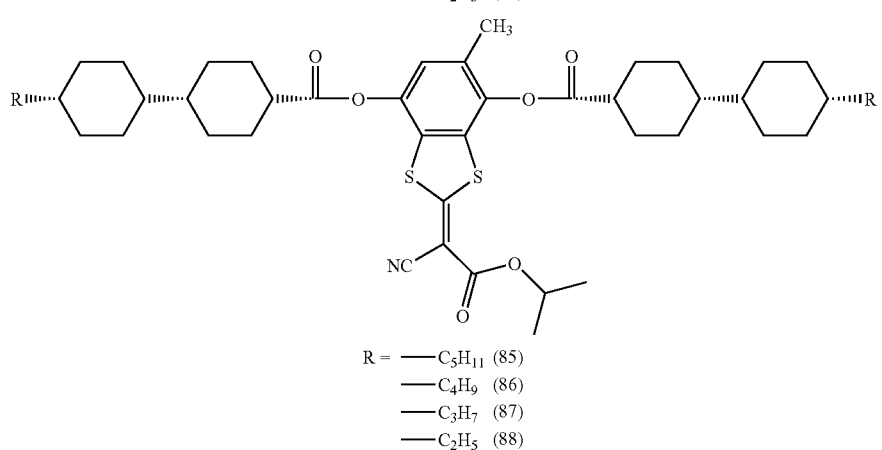
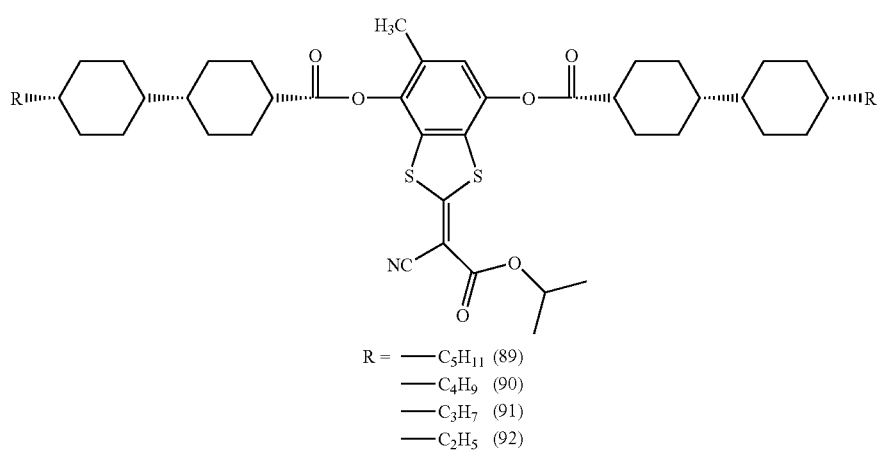

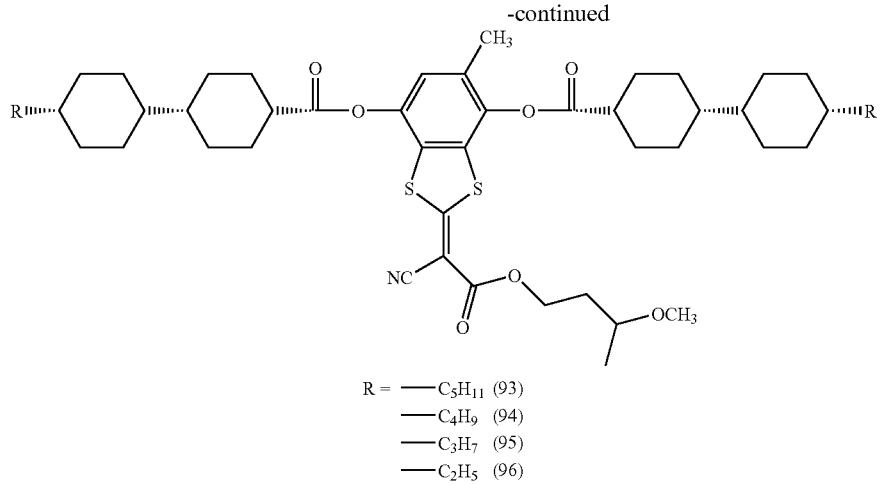
R = —C₅H₁₁ (93)
—C₄H₉ (94)
—C₃H₇ (95)
—C₂H₅ (96)
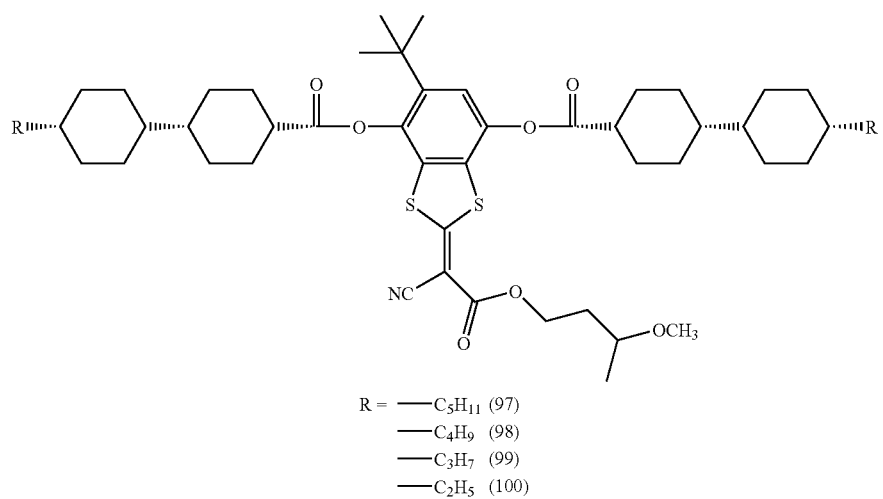
R = —C₅H₁₁ (97)
—C₄H₉ (98)
—C₃H₇ (99)
—C₂H₅ (100)
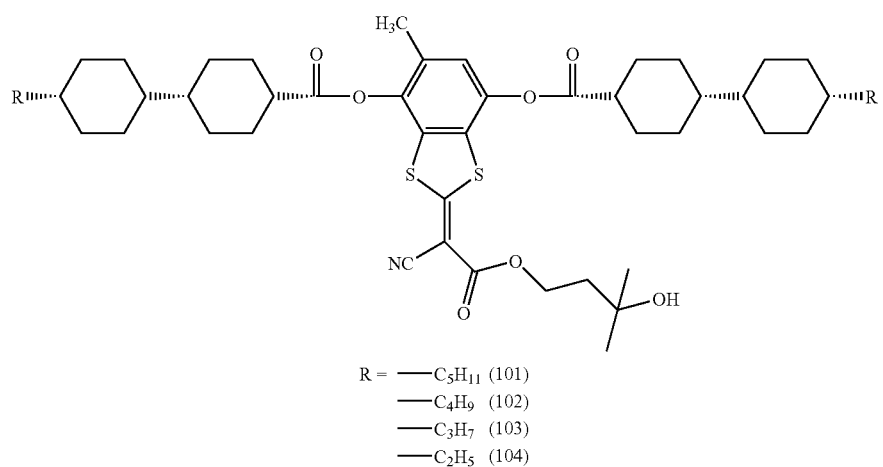
R = —C₅H₁₁ (101)
—C₄H₉ (102)
—C₃H₇ (103)
—C₂H₅ (104)

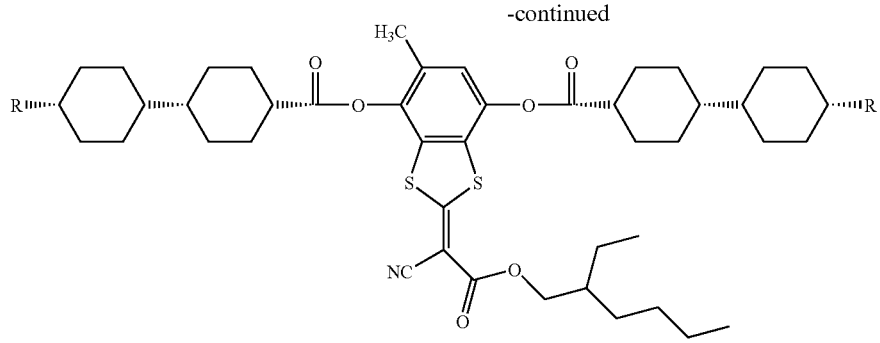
R = —C₅H₁₁ (105)
—C₄H₉ (106)
—C₃H₇ (107)
—C₂H₅ (108)
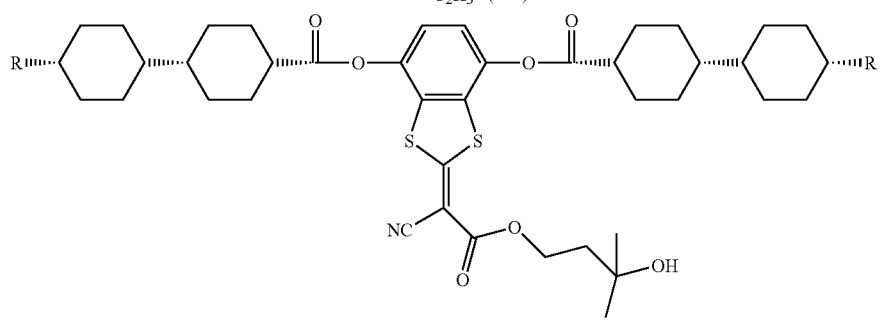
R = —C₅H₁₁ (109)
—C₄H₉ (110)
—C₃H₇ (111)
—C₂H₅ (112)
The compound represented by the formula (A) or (B) may be synthesized referring to known methods. For example, Example Compound (1) may be synthesized according to the following scheme.
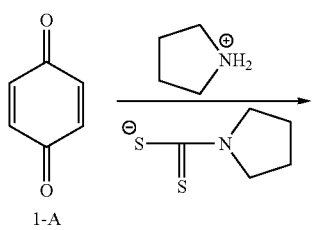
1-A
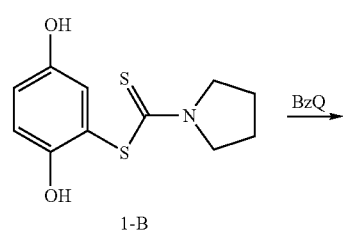
1-B
-continued
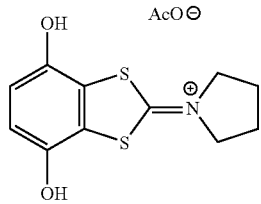
1-C
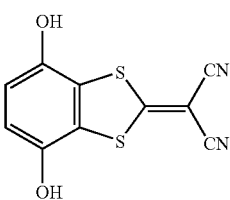
1-D
1-E
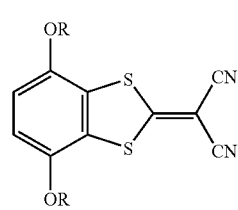

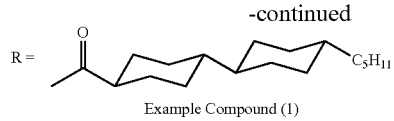

Example Compound (1)

In the above scheme, the steps for producing Compound (1-d) from Compound (1-A) may be carried out referring to the description in "Journal of Chemical Crystallography" (1997); 27(9); p. 515-526.

As shown in the above scheme, Example Compound (1) may be produced as follows. A tetrahydrofuran solution of Compound (1-E) is added with methanesulfonic acid chloride, added dropewise with N,N-di-iso-propylethylamine and then stirred. After that, the reaction solution is added with N,N-di-iso-propylethylamine, added dropewise with a tetrahydrofuran of Compound (1-D), and then added dropewise with a tetrahydrofuran solution of N,N-dimethylamino pyridine (DMAP).

Rod-Like Compound:

The cellulose acylate film to be used as the retardation film preferably comprises a rod-like compound in place of or along with the liquid crystal compound represented by the formula (A). The rod-like compound may be selected from not only liquid crystal compounds but also non-liquid crystal compounds, and preferably selected from liquid crystal compounds. The rod-like compound may be aligned together with the liquid crystal compound in a cellulose acylate film, and contribute to enhance retardation of the film. Also the rod-like compound may contribute to improvement in solubility of the liquid crystal compound in the film.

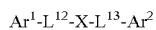 Formula (a)

In formula (a), $Ar^1$ and $Ar^2$ independently represent an aromatic group; $L^{12}$ and $L^{13}$ independently represent —O—CO— or —CO—O—; X represents 1,4-cyclohexylen, vinylene or ethynylene.

In the description, the term "aromatic group" is used for any substituted or non-substituted aryl (aromatic hydrocarbon) group and any substituted or non-substituted aromatic heterocyclic group.

Substituted or non-substituted aryl groups are preferred to substituted or non-substituted aromatic heterocyclic group. A hetero ring in the aromatic heterocyclic group is generally unsaturated. Preferably, the aromatic hetero ring is selected from 5-, 6- and 7-membered rings; and more preferably 5- and 6-membered rings. An aromatic hetero ring generally has the maximum number of double bonds. Preferred examples of the hetero atom embedded in the hetero ring include nitrogen, oxygen and sulfur atoms; and more preferred examples include nitrogen and sulfur atoms.

Examples of the aromatic ring in the aromatic group include benzene, furan, thiophene, pyrrole, oxazole, thiazole, imidazole, triazole, pyridine, pyrimidine and pyrazine rings; and among these, a benzene ring is especially preferred.

Examples of the substituent, that the substituted aryl group and the substituted aromatic heterocyclic group have, include halogen atoms (e.g., F, Cl, Br, and I), hydroxyl, carboxyl, cyano, amino, alkylaminos (e.g., methylamino, ethylamino, butylamino and dimethylamino), nitro, sulfo, carbamoyl, alkylcarbamoyls (e.g., N-methylcarbamoyl, N-ethylcarbamoyl, and N,N-dimethylcarbamoyl), sulfamoyl, alkylsulfamoyls (e.g., N-methylsulfamoyl, N-ethylsulfamoyl, and N,N-dimethylsulfamyl), ureido, alkylureidos (e.g., N-methylureido, N,N-dimethylureido, and N,N,N'-trimethyl ureido), alkyls (e.g., methyl, ethyl, propyl, butyl, pentyl, heptyl, octyl, isopropyl, s-butyl, t-amyl, cyclohexy, and cyclopentyl), alkenyls (e.g., vinyl, allyl, and hexenyl), alkynyls (e.g., ethynyl and butynyl), acyls (e.g., formyl, acetyl, butyryl, hexanoyl and lauryl), acyloxys (e.g., acetoxy, butyryloxy, hexanoyloxy, and lauryloxy), alkoxys (e.g., methoxy, ethoxy, propoxy, butoxy, pentyloxy, heptyloxy, and octyloxy), aryloxys (e.g., phenoxy), alkoxycarbonyls (e.g., methoxycarbonyl, ethoxycarbonyl, propoxycarbonyl, butoxycarbonyl, pentyloxycarbonyl, and heptyloxycarbonyl), aryloxycarbonyls (e.g., phenoxycarbonyl), alkoxycarbonylaminos (e.g., butoxycarbonylamino, and hexylcarbonylamino), alkylthios (e.g., methylthio, ethylthio, propylthio, butylthio, pentylthio, heptylthio and octylthio), arylthios (e.g., phenylthio), alkylsulfonyl (e.g., methylsulfonyl, ethylsulfonyl, propylsulfonyl, butylsulfonyl, pentylsulfonyl, heptylsulfonyl, and octylsulfonyl), amidos (e.g., acetamido, butylamido, hexylamido, and laurylamido), and non-aromatic hetero ring residues (e.g., morpholino, and pyridyl).

Among these, halogen atoms, cyano, carboxyl, hydroxyl, amino, alkyl-substituted aminos, acyls, acyloxys, amidos, alkoxycarbonyls, alkoxys, alkylthios and alkyls are preferred.

The alkyl moiety in the alkyl amino, alkoxycarbonyl, alkoxy or alkylthio may have at least one substituent, Examples of the substituent in the alkyl moieties or in the alkyls include halogen atoms, hydroxyl, carboxyl, cyano, amino, alkylaminos, nitro, sulfo, carbamoyl, alkylcarbamoyls, sulfamoyl, alkylsulfamoyls, ureido, alkylureidos, alkenyls, alkynyls, acyls, acyloxys, acylaminos, alkoxys, aryloxys, alkoxycarbonyls, aryloxycarbonyls, alkoxycarbonylaminos, alkylthios, arylthios, alkylsulfonyls, amidos and non-aromatic hetero ring residues. Among these, halogen atoms, aminos, alkylaminos, alkoxycarbonyls and alkoxys are preferred.

In the formula (a), $L^{12}$ and $L^{13}$ independently represent —O—CO— or —CO—O—.

In the formula (a), X represents 1,4-cyclohexylen, vinylene or ethynylene.

Examples of the compound represented by the formula (a) include, but are not limited to, those shown below.

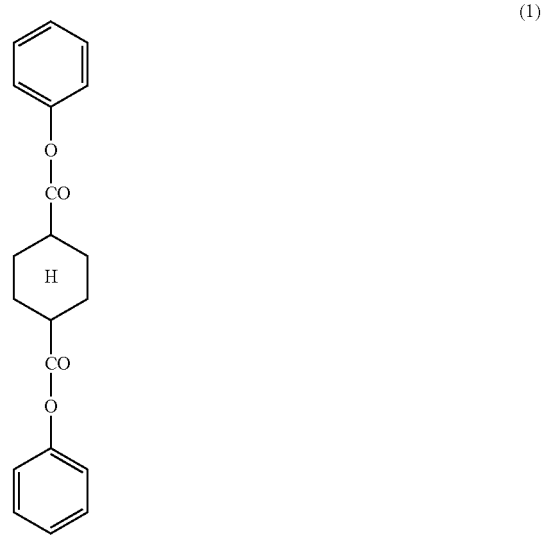

(1)

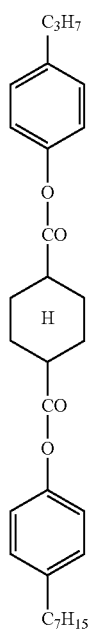
(2)
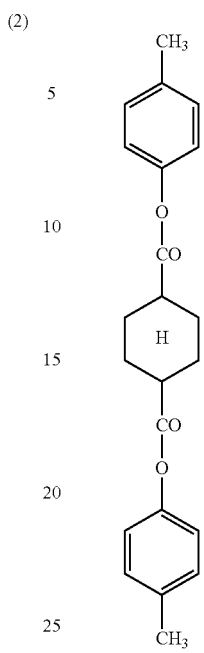
(4)
(3)
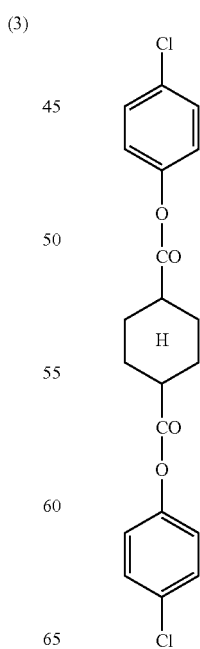
(5)

(6) 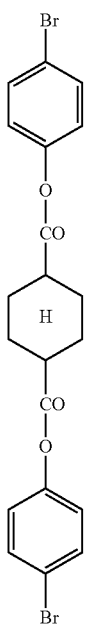
(7) 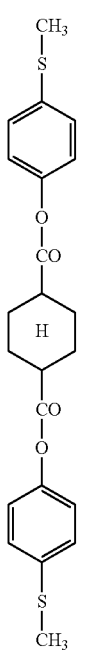
(8) 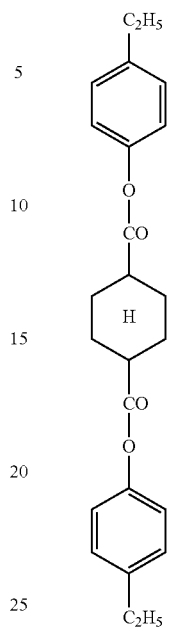
(9) 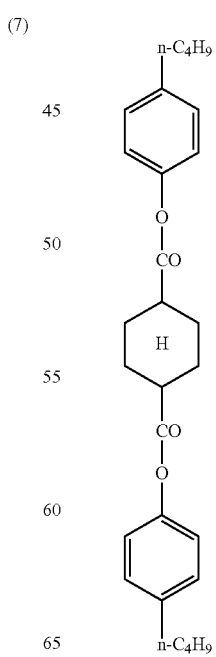

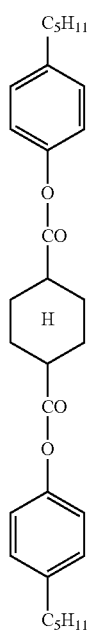 (10)
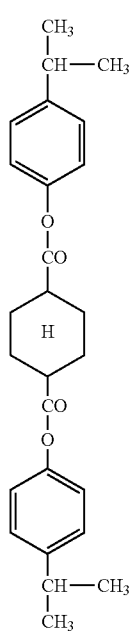 (11)
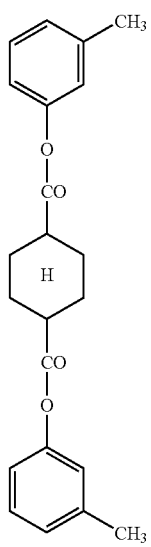 (12)
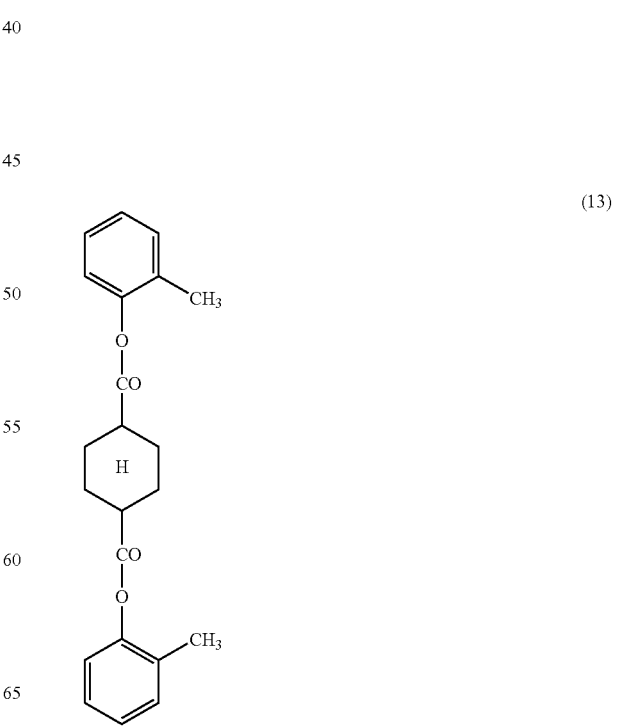 (13)

(14)
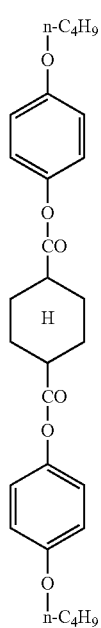
(15)
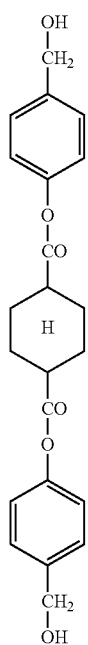
(16)
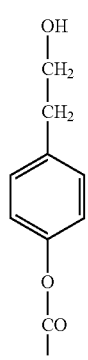
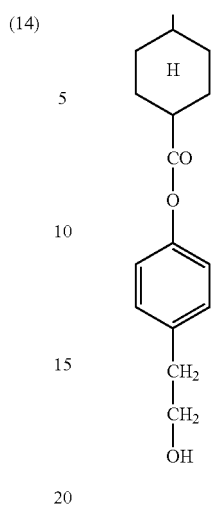
(17)
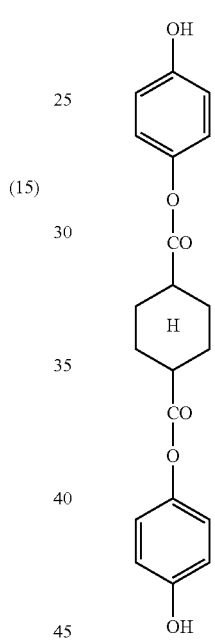
(18)
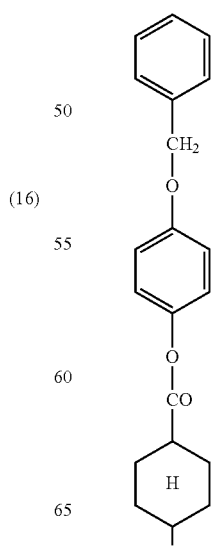

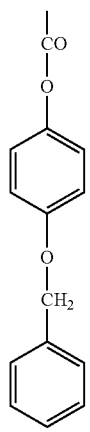
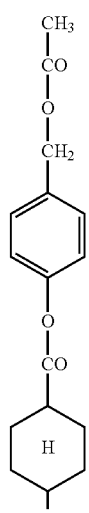
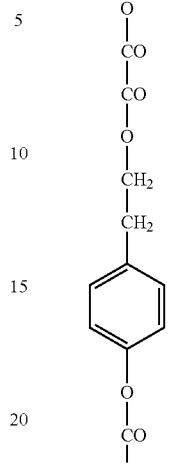
(19)
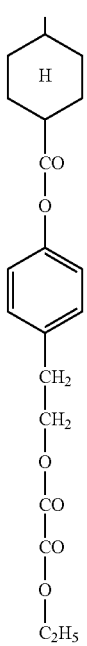
(20)

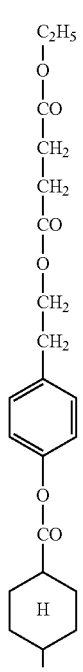
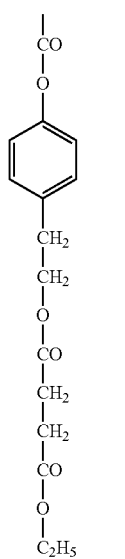
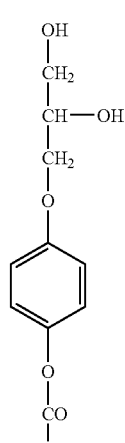
(21)
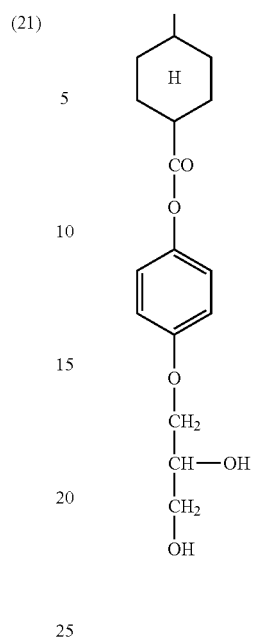
(22)
(23)
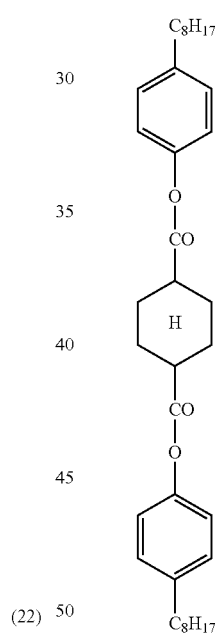
(24)
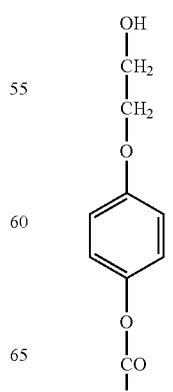

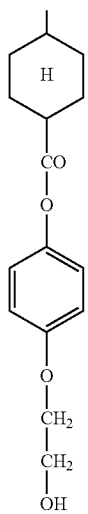
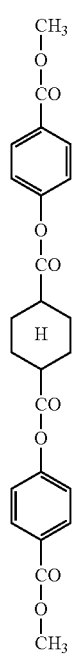
(25)
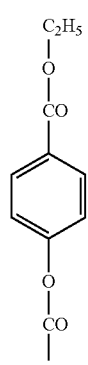
(26)
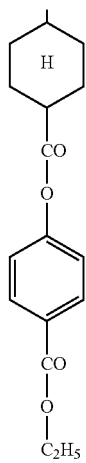
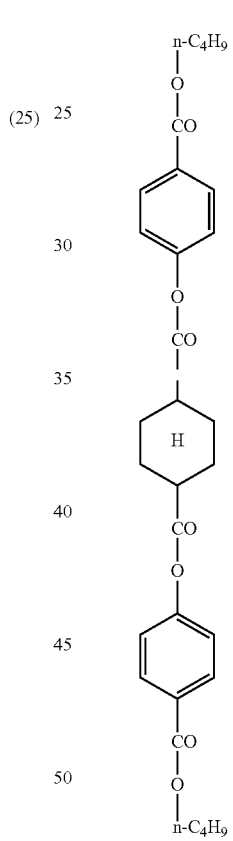
(27)
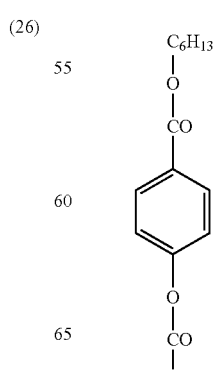
(28)

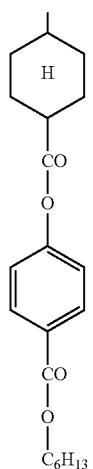
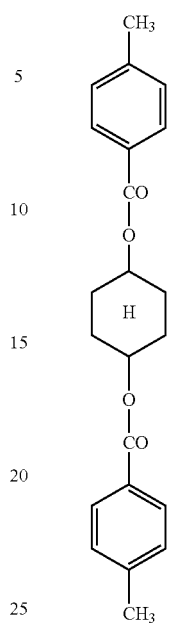
(30)
(29)
(31)

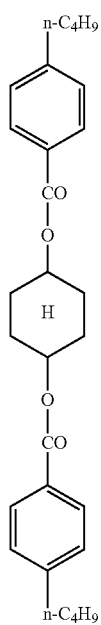
(32)
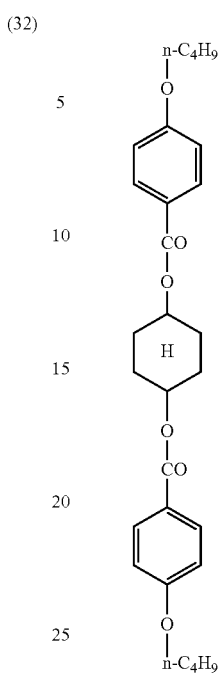
(34)
(33)
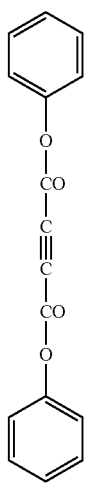
(35)

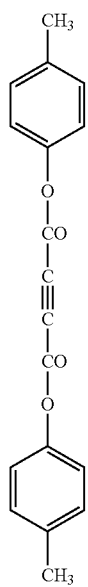
(36)
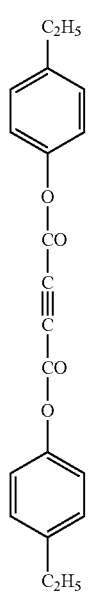
(37)
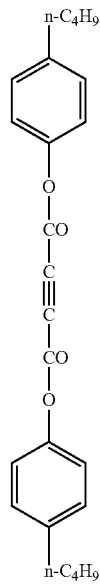
(38)
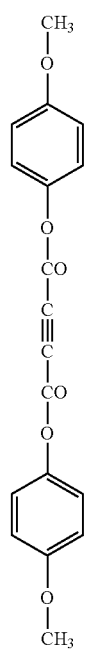
(39)
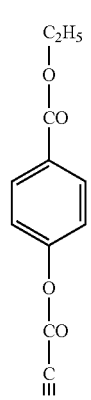
(40)

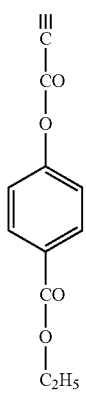
(41)
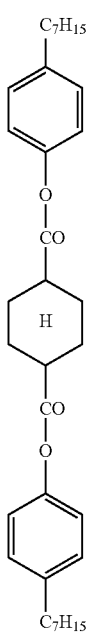
(42)
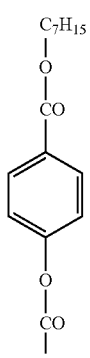
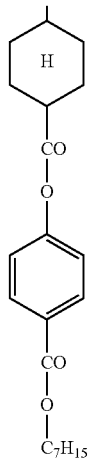
(43)
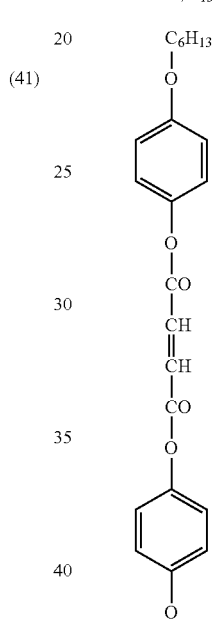
(44)
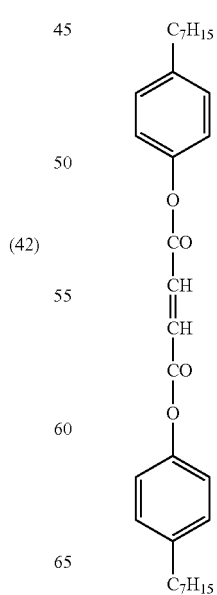

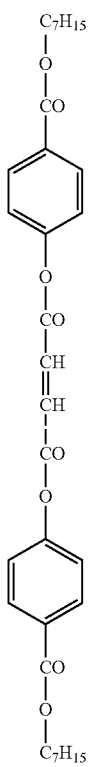

(45)

The example compounds (1) to (34), (41) and (42) have two asymmetric carbon atoms in the 1- and 4-positions in the cyclohexane ring, however it is noted that their molecular structures are meso-type structures and symmetric. Therefore, there is no enantiomer thereof, and are only geometric isomers, trans and cis types thereof. Of the example compound (1), the trans (1-trans) and cis (1-cis) types are shown below.

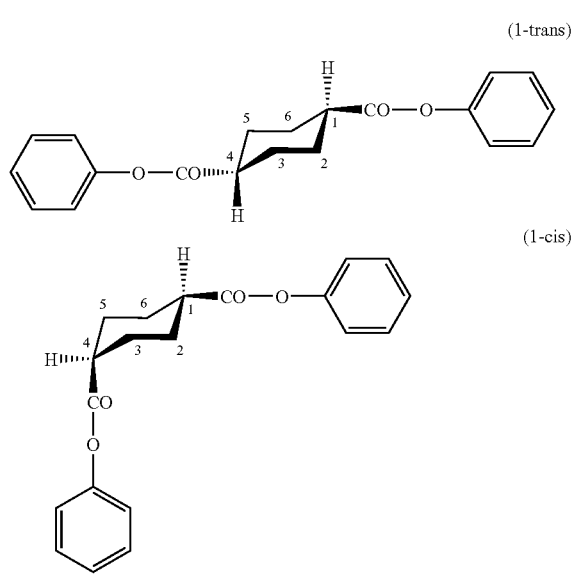

As described above, preferably, the molecular structures of the rod-like compounds are linear. Therefore, trans types are preferred to cis types.

Addition to the geometric isomers, there are enantiomers of the example compound (2) and (3), and the total number of the isomers is four. Among the geometric isomers, trans types are preferred to the cis types. And among the enantiomers, they are nearly equal, and D-, L- and racemic bodies are used equally.

There are trans and cis types as a center of the vinylene bond of the example compounds (43) to (45). On the same reason as above, the trans types are preferred to the cis types.

In the invention, the liquid crystal compound, having a polymerizable group(s), capable of polymerizing or hardening under the irradiation with UV-light or heat is preferably used. Such a polymerizable liquid crystal compound may be aligned in the film and then polymerizing to become a stable state. Low-molecular weight compounds such as a polymerization initiator may be used with the polymerizable liquid crystal compound.

Discotic Compound:

The cellulose acylate film to be used as the retardation film preferably comprises at least one discotic compound having an absorption peak at a wavelength falling within the range from 250 nm to 380 nm. The discotic compound may be selected from liquid crystal compounds or non-liquid crystal compounds, and preferably selected from liquid crystal compounds. By using the discotic compound with the liquid crystal compound(s), preferably selected from the compounds represented by formula (A) and/or compounds represented by formula (a), it is possible to control retardation, Re and/or Rth. Also the discotic compound may contribute to improvement in solubility of other additives such as the liquid crystal compound in the film.

In the embodiments where the liquid-crystal compound serving as an Re enhancer is added to a cellulose acylate, then the liquid-crystal compound may be aligned with a higher degree of alignment than that of the major ingredient, cellulose acylate, and therefore the cellulose acylate film may attain high Re. The liquid-crystal compound that is used as an Re enhancer may be added to a cellulose acylate composition along with any other optional additives to be added thereto. More concretely, it is desirable that the liquid-crystal compound is dissolved in an organic solvent such as alcohol, methylene chloride or dioxolane, and then the solution is added to a polymer solution (preferably, a cellulose acylate solution). The ratio by mass of the liquid-crystal compound to all additives is preferably from 5 to 100% by mass, more preferably from 50 to 100% by mass. Also preferably, the amount of the liquid-crystal compound to be added is from 0.1 to 30% by mass of the total mass of the cellulose acylate composition, more preferably from 0.5 to 20% by mass, even more preferably from 1 to 10% by mass.

In the embodiments where a rod-like compound is added to the cellulose acylate composition along with the liquid-crystal compound thereto, the added amount of the rod-like compound is preferably from 0.1 to 30% by mass of the total mass of the cellulose acylate composition, more preferably from 0.5 to 20% by mass, even more preferably from 1 to 10% by mass.

In the embodiments where a discotic compound is added to the cellulose acylate composition along with the liquid-crystal compound thereto, the added amount of the discotic compound is preferably from 0.1 to 30% by mass of the total mass of the cellulose acylate composition, more preferably from 0.5 to 20% by mass, even more preferably from 1 to 10% by mass.

In the invention, the thickness of the retardation film is not specifically defined; however for satisfying the requirement for device thickness reduction, the thickness of the film is preferably equal to or less than 100 µm, more preferably equal to or less than 80 µm, even more preferably equal to or less than 60 µm. From the viewpoint of device thickness reduction, the film is preferably as thin as possible; but in general, the thickness of polymer film is at least 30 µm.

The retardation film for use in the invention has one characteristic feature in that it has reversed wavelength dispersion characteristics of retardation Re, as so mentioned in the above, and preferably, it also has reversed wavelength dispersion characteristics of retardation Rth.

Also as so mentioned in the above, the retardation film for use in the invention preferably satisfies the following formula (VII):

$$1.2 \leq Rth(550)/Re(550) \leq 2.6 \tag{VII}$$

In order to make the cellulose acylate film have Rth/Re falling within the range, Re of the film must be increased in some degree, not too much increasing Rth thereof, within a range that satisfies the above formulas (I) and (II). One method for it comprises stretching the film. The cellulose acylate film for the retardation film comprises a composition that contains a liquid-crystal compound, and therefore Rth/Re of the film may be so controlled as to fall within the above range by controlling the temperature in stretching it or by controlling the amount of the organic solvent in the film so that the film could have a liquid-crystal phase temperature at which the degree of alignment of the liquid-crystal compound could be higher in the stretched film.

Plasticizer:

A plasticizer may be added to the cellulose acylate film for the retardation film for the purpose of improving the mechanical properties thereof or for increasing the drying efficiency thereof. As the plasticizer, usable is a phosphate or a carboxylate. Examples of the phosphate include triphenyl phosphate (TPP) and tricresyl phosphate (TCP). The carboxylate typically includes phthalates and citrates. Examples of the phthalates are dimethyl phthalate (DMP), diethyl phthalate (DEP), dibutyl phthalate (DBP), dioctyl phthalate (DOP), diphenyl phthalate (DPP) and diethylhexyl phthalate (DEHP). Examples of the citrates are triethyl O-acetylcitrate (OACTE) and tributyl O-acetylcitrate (OACTB). Examples of other carboxylates are butyl oleate, methylacetyl ricinoleate, dibutyl sebacate, and various trimellitates. Preferred are phthalate plasticizers (DMP, DEP, DBP, DOP, DPP, DEHP). More preferred are DEP and DPP.

The amount of the plasticizer to be added is preferably from 0.1 to 25% by mass of the amount of the cellulose acylate, more preferably from 1 to 20% by mass, even more preferably from 3 to 15% by mass.

Polymer Plasticizer:

In the invention, usable is a polymer plasticizer as the above-mentioned plasticizer.

The molecular weight of the polymer plasticizer is a mean molecular weight, and the plasticizer comprises a mixture of molecules each having a different molecular weight. In solution-casting film formation, the plasticizer contributes toward promoting the evaporation speed of the solvent and reducing the residual solvent amount. Also in a polymer film formed by melt-casting film formation, the plasticizer is useful as contributing toward preventing coloration or preventing film strength depression. Further, adding such a polymer plasticizer to the polymer film usable as the retardation film in the invention is effective from the viewpoint of film quality improvement of, for example, enhancing the mechanical properties of the film, imparting flexibility and water absorption resistance to the film, and reducing the moisture permeability of the film. Further in the invention, adding a polymer plasticizer is extremely effective for improving the film handlability in a process of film production, as demonstrated in Examples given hereinunder.

In the invention, the term "polymer plasticizer" is meant to include all plasticizers that have one or more repetitive unit structures in the molecular structure. The polymer plasticizer structure for use in the invention has a number-average molecular weight of from 600 to 10000 or so, preferably from 700 to 8000 or so, more preferably from 700 to 5000 or so, still more preferably from 1000 to 3500 or so.

The polymer plasticizer may be liquid or solid at the ambient temperature and humidity at which it is used. Depending on the film formation mode, the preferred melting point range of the polymer plasticizer to be used may be fractionated. In an embodiment of solution-casting film formation, a plasticizer having a melting point of from −100° C. to 150° C. or so is preferably selected, more preferably a plasticizer having a melting point of from −100° C. to 70° C. or so, even more preferably a plasticizer having a melting point of from −100° C. to 50° C. or so. Different from this, in an embodiment of melt-casting film formation, a plasticizer having a melting point of from −100° C. to 200° C. is preferably selected, more preferably a plasticizer having a melting point of from −100° C. to 170° C. or so, even more preferably a plasticizer having a melting point of from −100° C. to 150° C. or so.

Preferably, the plasticizer to be used is colored as little as possible, and is more preferably colorless. Also preferably, the plasticizer is thermally stable at higher temperatures, and more preferably, its decomposition starting temperature is 150° C. or higher, even more preferably 200° C. or higher. Not having any negative influence on the optical properties and the mechanical properties on the film containing it, the amount of the plasticizer to be added may be suitably determined within a range not having detracting from the object of the invention. The content of the polymer plasticizer that may be in the polymer film to be used as the retardation film is preferably from 1 to 50% by mass or so of the amount of the cellulose acylate, more preferably from 2 to 40% by mass or so, even more preferably from 5 to 30% by mass or so.

Examples of the polymer plasticizer usable in the invention include a polyester plasticizer having at least one repetitive unit derived from a dicarboxylic acid and at least one repetitive unit derived from a diol. The preferred range of the molecular weight of the polyester plasticizer is the same as that mentioned in the above. Both ends of the reaction product of dicarboxylic acid and diol may be kept untreated as such after the reaction, or may be further reacted with any of monocarboxylic acids, monoalcohols or phenols so as to be blocked or terminated. The terminated polymers do not contain a free carboxylic acid and are therefore favorable as their storage stability is enhanced.

Preferably, the dicarboxylic acid is selected from at least one aliphatic (preferably alkylene) dicarboxylic acid having from 2 to 20 carbon atoms (more preferably from 4 to 20 carbon atoms) and at least one aromatic dicarboxylic acid having from 8 to 20 carbon atoms; and more preferred are their mixtures.

Examples of the aliphatic dicarboxylic acid having from 2 to 20 carbon atoms include oxalic acid, malonic acid, succinic acid, maleic acid, fumaric acid, glutaric acid, adipic acid, pimelic acid, suberic acid, azelaic acid, sebacic acid, dodecanedicarboxylic acid and 1,4-cyclohexanedicarboxylic acid.

Examples of the aromatic dicarboxylic acid having from 8 to 20 carbon atoms include phthalic acid, terephthalic acid, isophthalic acid, 1,5-naphthalenedicarboxylic acid, 1,4- naphthalenedicarboxylic acid, 1,8-naphthalenedicarboxylic acid, 2,8-naphthalenedicarboxylic acid and 2,6-naphthalenedicarboxylic acid.

Among the above exemplified aliphatic dicarboxylic acid, malonic acid, succinic acid, maleic acid, fumaric acid, glutaric acid, adipic acid, azelaic acid, and 1,4-cyclohexanedicarboxylic acid are preferable; among the above exemplified aromatic dicarboxylic acid, phthalic acid, terephthalic acid, isophthalic acid, 1,5-naphthalenedicarboxylic acid, and 1,4-naphthalenedicarboxylic acid are preferable. Among the above exemplified aliphatic dicarboxylic acid, succinic acid, glutaric acid and adipic acid are more preferable; among the above exemplified aromatic dicarboxylic acid, phthalic acid, terephthalic acid and isophthalic acid are more preferable.

According to the invention, as the dicarboxylic acid, the mixture of at least one aliphatic dicarboxylic acid and at least one aromatic dicarboxylic acid is preferably used. Any mixtures thereof may be used, and the mixtures comprising plural types of the two dicarboxylic acids respectively may also be used.

The diol is preferably at least one selected from aliphatic diols having from 2 to 20 carbon atoms, alkyl ether diols having from 4 to 20 carbon atoms, and aromatic ring-containing diols having from 6 to 20 carbon atoms (hereinafter referred to as aromatic diols).

Examples of the aliphatic diol having from 2 to 20 carbon atoms include both alkyldiols and alicyclic diols, more concretely ethanediol, 1,2-propanediol, 1,3-propanediol, 1,2-butanediol, 1,3-butanediol, 2-methyl-1,3-propanediol, 1,4-butanediol, 1,5-pentanediol, 2,2-dimethyl-1,3-propanediol (neopentyl glycol), 2,2-diethyl-1,3-propanediol(3,3-dimethylolpentane), 2-n-butyl-2-ethyl-1,3-propanediol(3,3-dimethylolheptane), 3-methyl-1,5-pentanediol, 1,6-hexanediol, 2,2,4-trimethyl-1,3-pentanediol, 2-ethyl-1,3-hexanediol, 2-methyl-1,8-octanediol, 1,9-nonanediol, 1,10-decanediol, 1,12-octadecanediol, 1,4-cyclohexane diol, and 1,4-cyclohexane dimethanol. These diols may be used as a mixture of two or more of them.

Among the above exemplified aliphatic diols, ethanediol, 1,2-propanediol, 1,3-propanediol, 1,2-butanediol, 1,3-butanediol, 2-methyl-1,3-propanediol, 1,4-butanediol, 1,5-pentanediol, 3-methyl-1,5-pentanediol, 1,6-hexanediol, 1,4-cyclohexane diol, and 1,4-cyclohexane dimethanol are preferable; ethanediol, 1,2-propanediol, 1,3-propanediol, 1,2-butanediol, 1,3-butanediol, 1,4-butanediol, 1,5-pentanediol, 1,6-hexanediol, 1,4-cyclohexane diol, and 1,4-cyclohexane dimethanol are more preferable.

Examples of the alkyl ether diol having from 4 to 20 carbon atoms include polytetramethylene ether glycol, polyethylene ether glycol and polypropylene ether glycol, and their combinations. Not specifically defined, the mean degree of polymerization of the polymers is preferably from 2 to 20, more preferably from 2 to 10, even more preferably from 2 to 5, still more preferably from 2 to 4. Commercial products may also be used. As commercial polyether glycols, usable are Carbowax resin, Pluronics resin and Niax resin.

Examples of the aromatic diol having from 6 to 20 carbon atoms include bisphenol A, 1,2-hydroxybenzene, 1,3-hydroxybenzene, 1,4-hydroxybenzene and 1,4-benzenedimethanol. Preferred are bisphenol A, 1,4-hydroxybenzene and 1,4-benzenedimethanol.

Preferably, the polyester plasticizer for use in the invention is terminated with a hydrophobic group such as an alkyl group or an aromatic group. As terminated with a hydrophobic group and thus protected by it, the plasticizer may be protected from being deteriorated with time under high-temperature high-humidity condition and the ester group therein may be prevented from being hydrolyzed. In order that both ends of the polyester plasticizer could not be a carboxylic acid or OH group, the polyester plasticizer is preferably protected with a monoalcohol residue or a monocarboxylic acid residue.

The monoalcohol residue is preferably at least one selected from monoalcohol residues having from 1 to 30 carbon atoms; and examples of the monoalcohol residue include residues of aliphatic alcohols such as methanol, ethanol, propanol, isopropanol, butanol, isobutanol, pentanol, isopentanol, hexanol, iso hexanol, cyclohexyl alcohol, octanol, iso octanol, 2-ethyl hexyl alcohol, nonyl alcohol, iso nonyl alcohol, tert-nonyl alcohol, decanol, dodecanol, dodecahexanol, dodeca octanol, allyl alcohol, and oleyl alcohol; and residues of substituted alcohols such as benzyl alcohol and 3-pheny alcohol.

Examples of the alcohol residue for termination include methanol, ethanol, propanol, isopropanol, butanol, isobutanol, isopentanol, hexanol, iso hexanol, cyclohexyl alcohol, iso octanol, 2-ethyl hexyl alcohol, iso nonyl alcohol, oleyl alcohol and benzyl alcohol; and the residues of methanol, ethanol, propanol, isobutanol, cyclohexyl alcohol, 2-ethyl hexyl alcohol, iso nonyl alcohol and benzyl alcohol are more preferable.

The termination may be carried out with monocarboxylic acid; and the residue of the monocarboxylic acid is preferably selected from residues of $C_{1-30}$ substituted or non-substituted monocarboxylic acids. The monocarboxylic acid may be selected from aliphatic monocarboxylic acids or aromatic-ring containing monocarboxylic acids. Preferable examples of the monocarboxylic acid include aliphatic monocarboxylic acids such as acetic acid, propionic acid, butanoic acid, caprylic acid, caproic acid, decane acid, dodecane acid, stearic acid and oleic acid; and aromatic-ring containing monocarboxylic acids such as benzoic acid, p-tert-butyl benzoic acid, p-tert-amyl benzoic acid, ortho toluic acid, para toluic acid, dimethyl benzoate, ethyl benzoate, normal propyl benzoate, amino benzoic acid and acetoxy benzoic acid. Two ore more compounds may be used in combination.

The polyester plasticizer may be readily produced according to an ordinary method, for example, a thermal melt condensation method of polyesterification or interesterification of the above-mentioned dicarboxylic acid and diol and optionally a monocarboxylic acid or monoalcohol for termination, or an interfacial condensation method of reacting a chloride of those acids and a glycol. The polyester plasticizers are described in detail in Koichi Murai's "Plasticizers, Their Theory and Application" (by Miyuki Publishing, 1st Ed., issued on Mar. 1, 1973). Also usable herein are the materials described in JPA Nos. hei 05-155809, hei 05-155810, hei 05-197073, 2006-259494, hei 07-330670, 2006-342227, and 2007-003679.

Other Polymer Plasticizers:

Not limited to the above-mentioned polyester plasticizers, any other polymer plasticizers may also be used in the invention. Examples of the other polymer plasticizers include polyester polyurethane plasticizers, aliphatic hydrocarbon polymers, alicyclic hydrocarbon polymers; (meth)acrylate polymers such as polyacrylates and polymethacrylates (in which the ester group includes a methyl group, an ethyl group, a propyl group, a butyl group, an isobutyl group, a pentyl group, a hexyl group, a cyclohexyl group, an octyl group, a 2-ethylhexyl group, a nonyl group, an isononyl group, a tert-nonyl group, a dodecyl group, a tridecyl group, a stearyl group, an oleyl group, a benzyl group, a phenyl group); vinyl polymers such as polyvinyl isobutyl ether, poly-N-vinylpyrrolidone; styrene polymers such as polystyrene, poly-4-hydroxystyrene; polyethers such as polyethylene oxide, polypropylene oxide; polyamides, polyurethanes, polyureas, phenol-formaldehyde condensates, urea-formaldehyde condensates, and polyvinyl acetate.

Of those, more preferred are (meth)acrylate polymers. The (meth)acrylate polymers are preferably homopolymers and copolymers produced from (meth)acrylic monomers such as alkyl acrylates or methacrylates.

Examples of (meth)acrylate monomer having no aromatic ring include methyl(meth)acrylate, ethyl(meth)acrylate, (i- or n-)propyl(meth)acrylate, (n-,i-,s- or t-)butyl(meth)acrylate, (n-,i- or s-)pentyl(meth)acrylate, (n- or i-)hexyl(meth)acrylate, (n- or i-)heptyl(meth)acrylate, (n- or i-)octyl(meth)acrylate, (n- or i-)nonyl(meth)acrylate, (n- or i-)myristyl (meth)acrylate, 2-ethyl hexyl(meth)acrylate, E-caprolactam (meth)acrylate, 2-hydroxy ethyl(meth)acrylate, 2-hydroxy propyl(meth)acrylate, 3-hydroxy propyl(meth)acrylate, 4-hydroxy butyl(meth)acrylate, 2-hydroxy butyl(meth)acrylate, 2-methoxy ethyl(meth)acrylate and 2-ethoxy ethyl (meth)acrylate. The term "(meth)acrylate" means both of any acrylates and methacrylates.

Examples of (meth)acrylate monomer having one or more aromatic ring include styrene, methyl styrene and hydroxy styrene.

When the (meth)acrylic polymers are copolymers, preferred are copolymers comprising a repetitive unit derived from X (hydrophilic group-having monomer component) and a repetitive unit derived from Y (hydrophilic group-free monomer component) in a ratio (by mol) X/Y of from 1/1 to 1/99.

The content of the (meth)acrylic polymer is preferably from 1 to 20% by mass of the cellulose acylate to be combined with it. The (meth)acrylic polymers may be produced with reference to the method described in JPA No. 2003-12859.

Specific examples of preferred polymer plasticizers for use in the invention are shown below, to which, however, the invention should not be limited:

PP-1: Condensate of succinic acid/phthalic acid/ethanediol (1/1/2 by mol) (number-average molecular weight 2500)

PP-2: Condensate of glutaric acid/isophthalic acid/1,3-propanediol (1/1/2 by mol) (number-average molecular weight 1300)

PP-3: Condensate of adipic acid/terephthalic acid/1,2-propanediol (1/1/2 by mol) (number-average molecular weight 900)

PP-4: Condensate of succinic acid/terephthalic acid/ethanediol/1,4-cyclohexanedimethanol (1/1/1/1 by mol) (number-average molecular weight 3000)

PP-5: Condensate of succinic acid/glutaric acid/adipic acid/terephthalic acid/isophthalic acid/ethanediol/1,2-propanediol (1/1/1/1/1/3/2 by mol) (number-average molecular weight 2500)

PP-6: Condensate of succinic acid/adipic acid/terephthalic acid/ethanediol/1,2-propanediol (1/1/1/2/1 by mol) (number-average molecular weight 2500)

PP-7: Condensate of succinic acid/adipic acid/1,4-naphthalenedicarboxylic acid/ethanediol/1,2-propanediol (1/1/1/2/1 by mol) (number-average molecular weight 2000)

PP-8: Condensate of succinic acid/terephthalic acid/poly (mean degree of polymerization 5)propylene ether glycol/1,2-propanediol (2/1/1/2 by mol) (number-average molecular weight 2500)

PP-9: Condensate of succinic acid/terephthalic acid/poly (mean degree of polymerization 3)ethylene ether glycol/1,2-propanediol (1/3/2/2 by mol) (number-average molecular weight 3500)

PP-10: Butyl ester-terminated condensate of succinic acid/phthalic acid/ethanediol (1/1/2 by mol) (number-average molecular weight 2100)

PP-11: Cyclohexyl ester-terminated condensate of glutaric acid/isophthalic acid/1,3-propanediol (1/1/2 by mol) (number-average molecular weight 1500)

PP-12: 2-Ethylhexyl ester-terminated condensate of adipic acid/terephthalic acid/1,2-propanediol (1/1/2 by mol) (number-average molecular weight 2500)

PP-13: Isononyl ester-terminated condensate of succinic acid/terephthalic acid/ethanediol/1,4-cyclohexanedimethanol (1/1/1/1 by mol) (number-average molecular weight 3000)

PP-14: Propyl ester-terminated condensate of succinic acid/glutaric acid/adipic acid/terephthalic acid/isophthalic acid/ethanediol/1,2-propanediol (1/1/1/1/1/3/2 by mol) (number-average molecular weight 3000)

PP-15: 2-Ethylhexyl ester-terminated condensate of succinic acid/adipic acid/terephthalic acid/ethanediol/1,2-propanediol (1/1/1/2/1 by mol) (number-average molecular weight 3000)

PP-16: Benzyl ester-terminated condensate of succinic acid/adipic acid/1,4-naphthalenedicarboxylic acid/ethanediol/1,2-propanediol (1/1/1/2/1 by mol) (number-average molecular weight 3000)

PP-17: 2-Ethylhexyl ester-terminated condensate of succinic acid/terephthalic acid/poly (mean degree of polymerization 5)propylene ether glycol/1,2-propanediol (2/1/1/2 by mol) (number-average molecular weight 3500)

PP-18: 2-Ethylhexyl ester-terminated condensate of succinic acid/terephthalic acid/poly(mean degree of polymerization 4)ethylene ether glycol/1,2-propanediol (1/3/2/2 by mol) (number-average molecular weight 2500)

PP-19: Acetyl ester-terminated condensate of succinic acid/phthalic acid/ethanediol (1/1/2 by mol) (number-average molecular weight 2500)

PP-20: Acetyl ester-terminated condensate of glutaric acid/isophthalic acid/1,3-propanediol (1/1/2 by mol) (number-average molecular weight 1300)

PP-21: Benzoyl ester-terminated condensate of adipic acid/terephthalic acid/1,2-propanediol (1/1/2 by mol) (number-average molecular weight 900)

PP-22: Propionyl ester-terminated condensate of succinic acid/terephthalic acid/ethanediol/1,4-cyclohexanedimethanol (1/1/1/1 by mol) (number-average molecular weight 3000)

PP-23: Cyclohexanecarbonyl ester-terminated condensate of succinic acid/glutaric acid/adipic acid/terephthalic acid/isophthalic acid/ethanediol/1,2-propanediol (1/1/1/1/2/3/3 by mol) (number-average molecular weight 2500)

PP-24: Acetyl ester-terminated condensate of succinic acid/terephthalic acid/poly (mean degree of polymerization 3)ethylene ether glycol/1,2-propanediol (1/3/2/2 by mol) (number-average molecular weight 2500)

PP-25: Condensate of succinic acid/bisphenol A (1/1 by mol) (number-average molecular weight 2000)

PP-26: Condensate of succinic acid/terephthalic acid/ethanediol/bisphenol A (2/1/1/2 by mol) (number-average molecular weight 2500)

PP-27: Condensate of succinic acid/2,6-naphthalenedicarboxylic acid/bisphenol A/propanediol (1/2/2/1 by mol) (number-average molecular weight 1900)

PP-28: Condensate of succinic acid/adipic acid/2,6-naphthalenedicarboxylic acid/bisphenol A/diethylene glycol (1/1/2/2/2 by mol) (number-average molecular weight 2500)

PP-29: 2-Ethylhexyl ester-terminated condensate of succinic acid/terephthalic acid/ethanediol/bisphenol A (2/1/1/2 by mol) (number-average molecular weight 2500)

PP-30: 2-Ethylhexyl ester terminated condensate of succinic acid/2,6-naphthalenedicarboxylic acid/bisphenol A/propanediol (1/2/2/1 by mol) (number-average molecular weight 2300)

PP-31: Acetyl ester-terminated condensate of succinic acid/bisphenol A (1/1 by mol) (number-average molecular weight 2200)

PP-32: Condensate of adipic acid/ethanediol (1/1 by mol) (number-average molecular weight 1000)

PP-33: Condensate of adipic acid/1,6-hexanediol (1/1 by mol) (number-average molecular weight 1000)

PP-34: Condensate of adipic acid/succinic acid/ethanediol (2/3/5 by mol) (number-average molecular weight 910)

In the polymer plasticizer, the amount of the component having a number-average molecular weight of at most 500 is preferably at most 10% by mass or so. When heated at 200° C. for 10 minutes according to a thermal balance method, the mass reduction of the polymer plasticizer is preferably at most 5% or so. When heated at 140° C. for 60 minutes, the mass reduction is preferably at most 1% by mass or so.

In the invention, the plasticizer for use herein is preferably such that the maximum absorption wavelength ($\lambda$max) of the material of itself is as short as possible. In case where a plasticizer expresses retardation in cellulose acylate, most of it exhibits regular wavelength dispersion characteristics of retardation. When a plasticizer having a long $\lambda$max is used, then the reversed wavelength dispersion characteristics of the retardation film may lower owing to the plasticizer therein, and therefore, the produced film could not often satisfy the desired characteristics. Accordingly, $\lambda$max of the plasticizer is preferably short, concretely preferably at most 250 nm, ore preferably at most 230 nm.

One or more types of anti-degradation agents such as antioxidants, peroxide decomposers, radical inhibitors, metal deactivators, oxygen-trapping agents and amines may be added to the cellulose acylate film. The anti-degradation agents are described in JPA Nos. hei 3-199201, hei 5-1907073, hei 5-194789, hei 5-271471 and hei 6-107854. the amount of the anti-degradation agent is preferably from 0.01 to 1% by mass, more preferably from 0.01 to 2% by mass, with respect to the mass of the dope. When the amount of the agent is less than 0.01% by mass, the effect of the anti-degradation agent may not obtained; on the other hand, when the amount of the anti-degradation agent is more than 1% by mass, bleeding out (exuding) of the anti-degradation agent may occur at the film surface. Preferable examples of the anti-degradation agent include butyl hydroxy toluene (BHT) and tri benzyl amine (TBA).

The cellulose acylate film to be used in the invention may be selected from stretched films. The stretching ratio is preferably from 3 to 10% around. Stretching may be carried out by using a tenter. Stretching along the long direction may be carried out by using the nip portion between the rolls.

In the embodiments where the cellulose acylate film is made to function also as a transparent protective film for polarizing film, in addition to having the function as a retardation film, then the cellulose acylate film is preferably surface-treated for improving its adhesiveness to a polarizing element.

The surface treatment may be corona discharge treatment, glow discharge treatment, flame treatment, acid treatment, alkali treatment or UV irradiation treatment. Preferred are acid treatment and alkali treatment; and more preferred is alkali treatment.

[Polarizing Plate]

A polarizing plate produced by integrating a cellulose acylate film serving as the retardation film with a linear polarizing film (polarizing film) may be used in the liquid-crystal display device of the invention. The polarizing plate may be fabricated by laminating the retardation film and a linear polarizing film (hereinafter, the term "polarizing film" merely means "linear polarizing film"). The cellulose acylate film for the retardation film may serve also as a protective film for the linear polarizing film.

The linear polarizing film is preferably a coated polarizing film typically by Optiva Inc., or a polarizing film comprising a binder, and iodine or a dichroic dye. Iodine and a dichroic die in the linear polarizing film express polarizability when aligned in binder. Iodine and the dichroic dye preferably align along the binder molecules, or the dichroic dye preferably aligns in one direction as self-textured like liquid crystal. Polarizing elements that are now commercially available are generally fabricated by dipping a stretched polymer in a solution of iodine or a dichroic dye in a dyeing bath, whereby iodine or the dichroic dye is infiltrated into the binder.

On the surface of the linear polarizing film opposite to the surface thereof to which a retardation film has been stuck, a polymer film is preferably disposed (in a configuration of retardation film/polarizing film/polymer film).

Preferably, the polymer film has, as provided thereon, an antireflection film having soiling resistance and scratch resistance on its outermost surface. The antireflection film may be any conventional known one.

EXAMPLES

The invention is described more concretely with reference to the following Examples, in which the material and the reagent used, their amount and the ratio, the details of the treatment and the treatment process may be suitably modified or changed not overstepping the spirit and the scope of the invention. Accordingly, the invention should not be limited by the Examples mentioned below.

(Preparation of Retardation Film)

Retardation Film 001:

The following ingredients were mixed in the ratio indicated below to prepare a cellulose acylate solution. The cellulose acylate solution was cast, using a band caster, and the obtained web was peeled from the band, then stretched in TD by 20% at 140° C., and dried to give a cellulose acylate film having a thickness of 55 μm. This is Retardation film 001.

It was confirmed that the liquid-crystal compounds F-1 and F-2 mentioned below, used as a retardation enhancer, had liquid crystallinity.

| (Cellulose Acylate Solution) | |
|---|---|
| Cellulose acylate having a degree of acetyl substitution of 2.86 | 100 mas. pts. |
| Liquid-crystal compound F-1 mentioned below | 2 mas. pts. |
| Liquid-crystal compound F-2 mentioned below | 6 mas. pts. |
| Triphenyl phosphate | 3 mas. pts. |

| (Cellulose Acylate Solution) | |
|---|---|
| Diphenyl phosphate | 2 mas. pts. |
| Methylene chloride | 418 mas. pts. |
| Methanol | 62 mas. pts. |

F-1

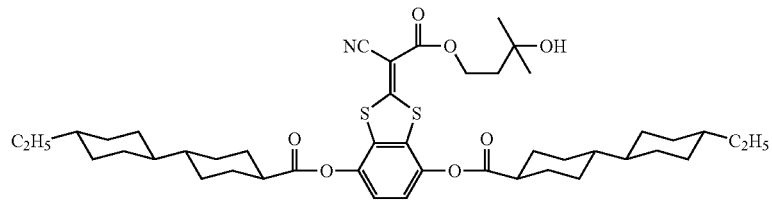

F-2

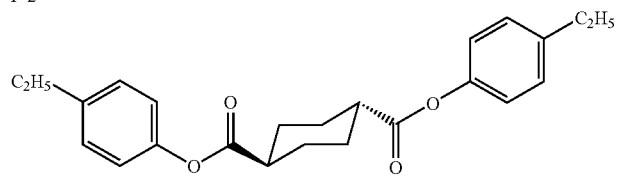

Retardation Film 002:

Retardation film 002 was produced in the same manner as that for Retardation film 001, for which, however, a cellulose acylate having a degree of acetyl substitution of 1.54 and a degree of propionyl substitution of 0.84 was used in place of the cellulose acylate having a degree of acetyl substitution of 2.86.

Retardation Film 003:

Retardation film 003 was produced in the same manner as that for Retardation film 001, for which, however, Liquid-crystal compound F-1 was not used but 8 parts by mass of the Liquid-crystal compound F-2 was used.

Retardation Film 004:

The following ingredients were mixed in the ratio indicated below to prepare a cellulose acylate solution. According to the same method as that for Retardation film 001, the web formed from the solution was peeled from the band, then stretched in TD direction by 30% at 125° C. and dried to give a cellulose acylate film having a thickness of 80 μm. This is Retardation film 004. λmax of the plasticizer PP-32 was shorter than 250 nm.

| (Cellulose Acylate Solution) | |
|---|---|
| Cellulose acylate having a degree of acetyl substitution of 2.81 | 100 mas. pts. |
| Above-mentioned liquid-crystal compound F-2 | 5 mas. pts. |
| PP-32 | 10 mas. pts. |
| Methylene chloride | 441 mas. pts. |
| Methanol | 66 mas. pts. |

Retardation Film 005:

Retardation film 005 was produced in the same manner as that for Retardation film 004, for which, however, a cellulose acylate having a degree of acetyl substitution of 2.77 was used in place of the cellulose acylate having a degree of acetyl substitution of 2.81.

Retardation Film 006:

A retardation film 006 was produced in the same manner as that for Retardation film 005, for which, however, the amount of the liquid-crystal compound F-2 to be added was changed to 4.5 parts by mass, and PP-33 was used as the plasticizer in place of PP-32.

Retardation Film 101:

The following ingredients were mixed in the ratio indicated below to prepare a cellulose acylate solution. The cellulose acylate solution was cast, using a band caster, and the obtained web was peeled from the band, then stretched in TD direction by 25% at 120° C., and dried to give a cellulose acylate film having a thickness of 55 μm. This is a retardation film 101.

It was confirmed that the discotic compound mentioned below, used as a retardation enhancer, did not have liquid crystallinity.

| (Cellulose Acylate Solution) | |
|---|---|
| Cellulose acylate having a degree of acetyl substitution of 2.81 | 100 mas. pts. |
| Retardation enhancer mentioned below (discotic compound) | 4 mas. pts. |
| Triphenyl phosphate (plasticizer) | 7 mas. pts. |
| Biphenyldiphenyl phosphate (plasticizer) | 5 mas. pts. |
| Methylene chloride | 430 mas. pts. |
| Methanol | 64 mas. pts. |

Retardation Enhancer (discotic compound):

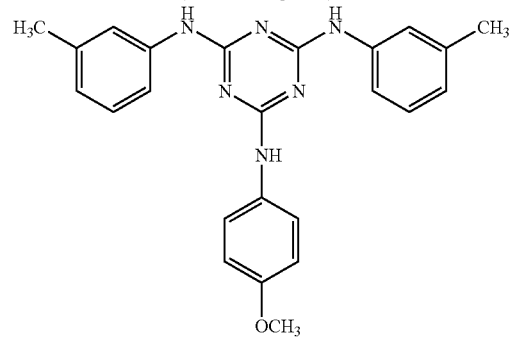

Retardation Film 201:

A commercially-available norbornene polymer film "ZEONOR" (by Nippon Zeon) was stretched by 30% in the cross direction at 140° C., with its machine direction kept fixed. This is Retardation film 201.

The retardation films, Retardation films of 001 to 006, 101 and 201, produced in the above were analyzed to measure the three-dimensional birefringence thereof at a wavelength of 450 nm, 550 nm and 650 nm, using an automatic birefringence meter KOBRA-21ADH (by Oji Scientific Instruments), and retardation in-plane Re thereof and also retardation along thickness direction Rth thereof to be determined by measuring Re with changing the tilt angle were measured. The results are shown in Table 1. As in Table 1, Retardation films 001 to 006 all satisfy the above formulas (I) to (VII).

into a polarizing plate in the same manner as that for the others 001 to 006 and 101, thereby fabricating Polarizing plate 201.

Example 1

(Construction of Liquid-Crystal Display Device)

Using Polarizing plate 001 fabricated in the above, Liquid-crystal display device 001 having the same constitution as in FIG. 1 was constructed. Concretely, a VA-mode liquid-crystal

TABLE 1

| Example No. | Retardation film No. | Polymer type | Liquid crystal compound F-1 | Liquid crystal compound F-2 | Discotic compound | (I) Re(550) | (II) Rth(550) | (III) Re(450)/ Re(550) | (IV) Re(650)/ Re(550) | (V) Rth(450)/ Rth(550) | (VI) Rth(650)/ Rth(550) | (VII) Rth(550)/ Re(550) |
|---|---|---|---|---|---|---|---|---|---|---|---|---|
| Example 1 | 001 | Cellulose acylate (Ac = 2.86) | 2 mas. pts. | 6 mas. pts. | — | 60 | 100 | 0.92 | 1.03 | 0.91 | 1.03 | 1.67 |
| Example 2 | 002 | Cellulose acylate (Ac = 1.54, Pro = 0.84) | 2 mas. pts. | 6 mas. pts. | — | 58 | 106 | 0.90 | 1.03 | 0.92 | 1.02 | 1.83 |
| Example 3 | 003 | Cellulose acylate (Ac = 2.86) | — | 8 mas. pts. | — | 53 | 127 | 0.92 | 1.04 | 0.96 | 1.02 | 2.40 |
| Example 4 | 004 | Cellulose acylate (Ac = 2.81) | — | 5 mas. pts. | — | 56 | 130 | 0.92 | 1.04 | 0.95 | 1.06 | 2.31 |
| Example 5 | 006 | Cellulose acylate (Ac = 2.77) | — | 5 mas. pts. | — | 63 | 135 | 0.91 | 1.04 | 0.90 | 1.03 | 2.13 |
| Example 6 | 006 | Cellulose acylate (Ac = 2.77) | — | 4.5 mas. pts. | — | 49 | 117 | 0.93 | 1.03 | 0.95 | 1.07 | 2.37 |
| Comparative Example 1 | 101 | Cellulose acylate (Ac = 2.81) | — | — | 4 mas. pts. | 42 | 130 | 1.02 | 0.98 | 1.02 | 0.98 | 3.10 |
| Comparative Example 2 | 102 | ZEONOR | — | — | — | 50 | 125 | 1.02 | 1.00 | 1.01 | 1.00 | 2.50 |

Ac: Degree of acetyl substitution
Pro: Degree of propionyl substitution (Fabrication of Polarizing Plate)

The surface of each of Retardation films 001 to 006 and 101 produced in the above was saponified with alkali. Concretely, the film was dipped in an aqueous 1.5 N sodium hydroxide solution at 55° C. for 2 minutes, then washed with a rinsing bath at room temperature, and neutralized with 0.1 N hydrochloric acid at 30° C. Again, this was washed with a rinsing bath at room temperature and dried with hot air at 100° C. Next, a polyvinyl alcohol film roll having a thickness of 80 μm was continuously stretched by 5 times in an aqueous iodine solution, then dried to give a polarizing film having a thickness of 20 μm. Using an aqueous 3% polyvinyl alcohol (Kuraray's PVA-117H) solution as an adhesive, the alkali-saponified retardation films 001 to 006 and 101, and a film Fujitac TD80UL (by FUJIFILM) also saponified with alkali in the same manner were prepared, and the former were individually combined with the latter and stuck together via a polarizing film sandwiched therebetween in such a manner that the saponified surface of the two films could face the polarizing film, thereby fabricating Polarizing plates 001 to 006 and 101 in which the retardation film and the film TD80UL are the protective films for the polarizing film.

The surface of Retardation film 201 was hydrophilicated by corona treatment, not by alkali saponification, and worked cell (Δnd=300 nm) was used as the liquid-crystal cell, and Polarizing plate 001 was incorporated in the device in FIG. 1 on the panel side and on the backlight side thereof (P1 and P2 in FIG. 1), thereby constructing the liquid-crystal display device. In the device, the slow axes of the retardation films were kept perpendicular to each other, as in FIG. 1.

Examples 2 to 3 and Comparative Examples 1 to 2

In the same manner as that for Liquid-crystal display device 001, other Liquid-crystal display devices 002 to 006 and 101 and 201 were constructed, for which, however, Polarizing plates 002 to 006, 101 and 102 fabricated in the above were used in place of Polarizing plate 001.

(Evaluation)

Transmittance in the Black and White States:

Liquid-crystal display devices 001 to 006, 101 and 201 constructed in the above were driven to measure the transmittance in the black and white states, in the front direction (in the normal line direction relative to the displaying plane) and in an oblique direction (in the direction at a polar angle of 45 degrees and an azimuth angle of 60 degrees), thereby to determine the front contrast and the oblique contrast thereof. The results are shown in Table 2.

Color Shift in the Black State:

Liquid-crystal display devices 001 to 006, 101 and 201 constructed in the above were driven to measure the color shift in the black state, Δu'v'(=√(u'max−u'min)$^2$+(v'max−v'min)$^2$). In this, u'max (v'max) means the largest u' (v') at an angle of from 0 to 360 degrees; and u'min (v'min) means the smallest u' (v') at an angle of from 0 to 360 degrees. The results are shown in following Table 2. As in Table 2, it is known that Liquid-crystal display devices 001 to 006 of Examples of the invention, comprising any of Retardation films 001 to 006 are all better than Liquid-crystal display devices 101 and 201 of Comparative Examples comprising any of Retardation films 101 and 201, in that the oblique contrast of the former is more excellent than that of the latter and that the color shift of the former is smaller than that of the latter.

TABLE 2

| LCD No. | Retardation Film No. | Front Contrast | Oblique Contrast*1 | Color Shift Δu'v' | Note |
|---|---|---|---|---|---|
| 001 | 001 | 1525 | 82 | 0.024 | Invention |
| 002 | 002 | 1510 | 76 | 0.030 | Invention |
| 003 | 003 | 1505 | 72 | 0.034 | Invention |
| 004 | 004 | 1530 | 75 | 0.034 | Invention |
| 005 | 005 | 1528 | 72 | 0.028 | Invention |
| 006 | 006 | 1505 | 70 | 0.036 | Invention |
| 101 | 101 | 1501 | 49 | 0.050 | Comparative Example |
| 102 | 102 | 1521 | 58 | 0.052 | Comparative Example |

The invention claimed is:

1. A liquid-crystal display device comprising:
a liquid-crystal cell comprising a liquid-crystal layer that aligns the substrate thereof in a black state,
two polarizing elements that are disposed to sandwich the liquid-crystal cell therebetween in a manner that their absorption axes are perpendicular to each other, and
retardation films having equivalent optical anisotropy that are disposed between each of the two polarizing elements and the liquid-crystal cell,
wherein the retardation films comprise a cellulose acylate and a liquid-crystal compound, and satisfy following formulas (I) to (VII):

$$30 \leq Re(550) \leq 80 \quad (I)$$

$$70 \leq Rth(550) \leq 140 \quad (II)$$

$$Re(450)/Re(550) < 1 \quad (III)$$

$$Re(650)/Re(550) > 1 \quad (IV)$$

$$Rth(450)/Rth(550) < 1 \quad (V)$$

$$Rth(650)/Rth(550) > 1 \quad (VI)$$

$$1.2 \leq Rth(550)/Re(550) < 2.6 \quad (VII)$$

wherein Re(λ) means retardation [nm] in plane of each of the films measured at a wavelength λ [nm]; and Rth(λ) means retardation [nm] along thickness direction of each of the films measured at a wavelength λ [nm];
wherein the retardation films are cellulose acylate films formed of a composition comprising the cellulose acylate, the liquid-crystal compound and a plasticizer having a maximum absorption wavelength λmax of at most 250 nm.

2. The liquid-crystal display device of claim 1, wherein the retardation films contain the liquid-crystal compound in an amount of from 0.1% by mass to 30% by mass, and the ratio of the liquid-crystal compound to the whole additive is from 5% by mass to 100% by mass.

3. The liquid-crystal display device of claim 1, wherein the liquid crystal compound is a compound represented by formula (A):

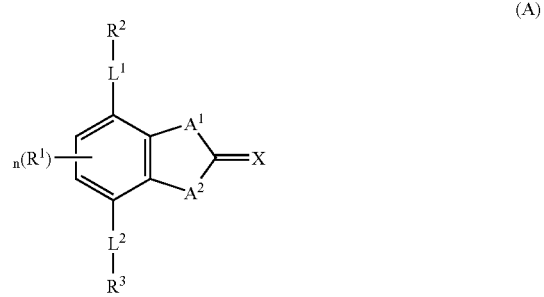

(A)

where L$^1$ and L$^2$ independently represent a single bond or a divalent linking group; A$^1$ and A$^2$ independently represent a group selected from the group consisting of —O—, —NR— where R represents a hydrogen atom or a substituent, —S— and —CO—; R$^1$, R$^2$ and R$^3$ independently represent a substituent; X represents a nonmetal atom selected from the groups 14-16 atoms, provided that X may bind with at least one hydrogen atom or substituent; and n is an integer from 0 to 2.

4. The liquid-crystal display device of claim 1, wherein the liquid crystal compound is a compound represented by formula (a):

$$Ar^1-L^{12}-X-L^{13}-Ar^2 \quad (a)$$

where Ar$^1$ and Ar$^2$ each independently represent an aromatic group; L$^{12}$ and L$^{13}$ each independently represent a divalent linking group selected from the group consisting of —O—CO— and —CO—O—; and X represents 1,4-dicyclo hexylene, 1,4-dicyclo hexylene, vinylene or ethynylene.

5. The liquid-crystal display device of claim 1, wherein the retardation films further comprise a discotic compound having an absorption peak at a wavelength falling within the range from 250 nm to 380 nm.

6. The liquid-crystal display device of claim 1, wherein the retardation films have a thickness falling within the range from 30 to 100 μm.

7. The liquid-crystal display device of claim 1, wherein the liquid-crystal layer in the black state and the retardation films satisfy the following formula (VIII):

$$0.5 \leq (2 \times Rth(550))/\Delta n(550) \times d \leq 1.3 \quad (VIII)$$

where Δn(550) means the intrinsic birefringence at 550 nm of the liquid crystal in the liquid-crystal layer; d means the thickness of the liquid-crystal layer; and Rth(550) means retardation along thickness direction of each of the retardation films at 550 nm.

8. The liquid-crystal display device of claim 1, wherein Δnd of the liquid-crystal layer is from 250 to 345 nm, and wherein the liquid-crystal layer in the black state and the retardation films satisfy the following formula (VIII):

$$0.5 \leq (2 \times Rth(550))/\Delta n(550) \times d \leq 1.3 \quad (VIII)$$

where Δn(550) means the intrinsic birefringence at 550 nm of the liquid crystal in the liquid-crystal layer; d means the thickness of the liquid-crystal layer; and Rth(550) means retardation along thickness direction of each of the retardation films at 550 nm.

* * * * *